(12) United States Patent
Sokhandan Asl

(10) Patent No.: US 12,223,422 B2
(45) Date of Patent: Feb. 11, 2025

(54) CONTINUOUS TRAINING METHODS FOR SYSTEMS IDENTIFYING ANOMALIES IN AN IMAGE OF AN OBJECT

(71) Applicant: ELEMENT AI INC., Montreal (CA)

(72) Inventor: Negin Sokhandan Asl, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 1164 days.

(21) Appl. No.: 17/062,019

(22) Filed: Oct. 2, 2020

(65) Prior Publication Data
US 2022/0108163 A1    Apr. 7, 2022

(51) Int. Cl.
G06N 3/08        (2023.01)
G06V 10/774   (2022.01)
G06V 10/82     (2022.01)

(52) U.S. Cl.
CPC .......... *G06N 3/08* (2013.01); *G06V 10/7753* (2022.01); *G06V 10/82* (2022.01)

(58) Field of Classification Search
CPC .......... G06N 3/08; G06N 3/045; G06N 3/047; G06N 3/084; G06N 3/088; G06V 10/7753; G06V 10/82; G06V 10/774
USPC ....................................................... 382/156
See application file for complete search history.

(56) References Cited

U.S. PATENT DOCUMENTS

| 10,043,088 B2 | 8/2018 | Odry et al. |
| 10,395,362 B2 | 8/2019 | Gupta et al. |
| 10,475,174 B2 | 11/2019 | Lim et al. |
| 10,540,578 B2 | 1/2020 | Madani et al. |
| 11,295,462 B2 * | 4/2022 | Bertram .................. G06T 3/14 |

(Continued)

FOREIGN PATENT DOCUMENTS

| CN | 111292754 | * | 6/2020 | ............. G01L 17/02 |
| KR | 101910926 | * | 10/2018 | ............ G06F 11/079 |

(Continued)

OTHER PUBLICATIONS

Bergmann et al., "MVTec AD—A Comprehensive Real-World Dataset for Unsupervised Anomaly Detection", Proceedings of the IEEE Conference on Computer Vision and Pattern Recognition, 2019, 9 pages.

(Continued)

*Primary Examiner* — Jerome Grant, II
(74) *Attorney, Agent, or Firm* — BCF LLP

(57) ABSTRACT

A system identifying anomalies in an image of an object is first trained using first sets of images corresponding to first anomaly types for the object. A model of the object is formed in a latent space. A label for each anomalous image is used to calculate vectors containing means and standard deviations for each first anomaly types. The means and standard deviations are used to calculate a log-likelihood loss for each first anomaly type. The system is retrained using second sets of images corresponding to second anomaly types for the object. The vectors are supplemented using labels for each second anomaly types. A statistically sufficient sample of information in the means and standard deviations vectors is supplied to the latent space. A log-likelihood loss for each of the first and second anomaly types is calculated based on their respective mean and standard deviation.

17 Claims, 17 Drawing Sheets

(56) References Cited

U.S. PATENT DOCUMENTS

| | | | |
|---|---|---|---|
| 2013/0084006 A1* | 4/2013 | Zhang | G06T 7/11 |
| | | | 382/173 |
| 2018/0374569 A1 | 12/2018 | Niculescu-Mizil | |
| 2019/0164287 A1 | 5/2019 | Gregson et al. | |
| 2019/0385018 A1 | 12/2019 | Ngo et al. | |
| 2020/0074622 A1 | 3/2020 | Yang et al. | |
| 2020/0134804 A1 | 4/2020 | Song et al. | |
| 2022/0067491 A1* | 3/2022 | Vengertsev | G11C 16/10 |
| 2022/0108163 A1* | 4/2022 | Sokhandan Asl | G06V 10/82 |
| 2024/0086705 A1* | 3/2024 | Hiromoto | G06N 3/08 |
| 2024/0095592 A1* | 3/2024 | Hiromoto | G06N 20/00 |

FOREIGN PATENT DOCUMENTS

| | | | | |
|---|---|---|---|---|
| TW | 202030652 | * | 8/2020 | G03F 7/705 |
| TW | 202032416 | * | 9/2020 | |
| WO | WO0079271 | * | 12/2000 | G01N 33/48 |
| WO | WO2020079685 | * | 4/2020 | G05D 1/00 |
| WO | 2021062133 A1 | | 4/2021 | |
| WO | WO2021062133 | * | 4/2021 | G06T 5/00 |

OTHER PUBLICATIONS

Zhai et al., "A generative adversarial network based framework for unsupervised visual surface inspection", IEEE International Conference on Acoustics, Speech and Signal Processing (ICASSP), 2018, pp. 1283-1287.

Ferguson et al., "Detection and segmentation of manufacturing defects with convolutional neural networks and transfer learning", Smart and sustainable manufacturing systems 2, 2018, 43 pages, https://www.ncbi.nlm.nih.gov/bmc/articles/PMC6512995/pdf/nihms-1520836.pdf.

Kobyzev et al., "Normalizing flows: An introduction and review of current methods", IEEE Transactions on Pattern Analysis and Machine Intelligence, 2020, pp. 1-17.

Kingma et al., "Glow: Generative flow with invertible 1x1 convolutions." Advances in neural information processing systems, 2018, 10 pages.

Wikipedia—Backpropagation, https://en.wikipedia.org/wiki/Backpropagation, pdf 8 pages.

Wikipedia—PyTorch, https://en.wikipedia.org/wiki/PyTorch, pdf 4 pages.

Wikipedia—Cross entropy, https://en.wikipedia.org/wiki/Cross_entropy, pdf 4 pages.

"L^2-Norm", WolframMatchWorld, https://mathworld.wolfram.com/L2-Norm.html, pdf 1 page.

Office Action with regard to the counterpart U.S. Appl. No. 17/062,004 mailed Mar. 3, 2022.

Detection and Segmentation of Manufacturing Defects, et al, 2018; https://arxiv.org/pdf/1808.02518.pdf (Year: 2018).

\* cited by examiner

CONTINUOUS TRAINING METHODS FOR SYSTEMS IDENTIFYING ANOMALIES IN AN IMAGE OF AN OBJECT

FIELD

The present technology relates to the field of computer assisted image inspection. In particular, the present technology introduces continuous training methods for systems identifying anomalies in an image of an object.

BACKGROUND

Unsupervised and semi-supervised visual anomaly detection and classification, used for example in manufacturing applications, pose very challenging problems. Some problems are related to the fact that, in most circumstances, labeling image data is cost prohibitive. Other problems are related to the fact that many defects in manufactured goods are very small and difficult to detect using visual anomaly detection mechanisms. Also, the nature of the defects tends to change over time and new types of defects may frequently occur. Consequently, conventional imaging solutions either require huge amounts of expensive labeled data that may actually be inaccurate. Also, conventional imaging solutions frequently become obsolete as new types of defects are discovered. Models used by these conventional imaging solutions need to be taken out of service and replaced with updated models. Such solutions are not scalable, are costly, and are therefore not sustainable in practice.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise high costs of labeling image data, lack of updatability to cater for new types of defects, and/or lack of scalability.

In one aspect, various implementations of the present technology provide a computer-implemented continuous training method for a system identifying anomalies in an image of an object, comprising:
training the system by:
supplying, to an image encoder, one or more first sets of images corresponding to one or more first anomaly types for the object, the image encoder forming a model of the object in a latent space,
supplying labels to an anomaly encoder, each label corresponding to a respective image among the one or more first sets of images corresponding to the one or more first anomaly types for the object, each label identifying a related anomaly type for the object,
calculating, at the anomaly encoder, a vector containing a mean for each of one or more first model modes defined for the one of more first anomaly types,
calculating, at the anomaly encoder, a vector containing a standard deviation for each of the one or more first model modes defined for the one of more first anomaly types, and
calculating a log-likelihood loss for each of the one or more first anomaly types based on their respective mean and standard deviation; and
retraining the system by:
supplying, to the image encoder, one or more second sets of images corresponding to one or more second anomaly types for the object, the image encoder updating the model of the object in the latent space,
supplying additional labels, to the anomaly encoder, each additional label corresponding to a respective image among the one or more second sets of images corresponding to the one or more second anomaly types for the object, each additional label identifying a related anomaly type for the object,
updating, at the anomaly encoder, the vector containing the mean for each of the one or more first model modes defined for the one of more first anomaly types by adding a mean for each of one or more second model modes defined for the one or more second anomaly types,
updating, at the anomaly encoder, the vector containing the standard deviation for each of the one or more first model modes defined for the one of more first anomaly types by adding a standard deviation for each of one or more second model modes defined for the one or more second anomaly types,
supplying, to the latent space, a statistically sufficient sample of information contained in the vectors containing the means and standard deviations, and calculating a log-likelihood loss for each of the first and second anomaly types based on their respective mean and standard deviation.

In some implementations of the present technology, the model of the object is a flow-based model.

In some implementations of the present technology, the model of the object is a generative adversarial network model.

In some implementations of the present technology, the model of the object is a variational autoencoder model.

In some implementations of the present technology, training the system further comprises using classification information for each of the one or more first anomaly types when forming the model of the object in the latent space; and retraining the system further comprises using classification information for each of the one or more first anomaly types and for each of the one or more second anomaly types when updating the model of the object in the latent space.

In some implementations of the present technology, the method further comprises supplying, to a classifier, a first label for each image among the one or more first sets of images; calculating, by the classifier, a first classification loss for each of the first anomaly types; using the first classification losses for training the system; supplying, to the classifier a second label for each image among the one or more second sets of images; calculating, by the classifier, a classification loss for each of the second anomaly types; and using the classification losses for retraining the system.

In some implementations of the present technology, the method further comprises supplying, to the classifier, a content of the latent space; using, at the classifier, the content of the latent space to classify each of the one or more first anomaly types for the object; and using, at the classifier, the content of the latent space to classify each of the one or more second anomaly types for the object.

In some implementations of the present technology, the content of the latent space supplied to the classifier is a portion of the latent space.

In some implementations of the present technology, the retraining of the system is performed without downtime of the system.

In some implementations of the present technology, training the system further comprises: supplying, to an image encoder the system, a set of anomaly-free images of an object; encoding, by the image encoder, each anomaly free image of the object to form a corresponding image model in the latent space; generating, in an image decoder of the system, an output image corresponding to each of the image models; and calculating, in the system, a reconstruction loss based on a norm of differences between each anomaly-free image of the object and the corresponding output image.

In some implementations of the present technology, the anomaly-free images of the object are augmented images.

In some implementations of the present technology, training the system further comprises calculating a regularization loss based on a ratio of an output of a previous layer of the model of the object of the object over an output of a current layer of the model of the object.

In some implementations of the present technology, the images of the one or more first sets of images corresponding to the one or more first anomaly types for the object and the images of the one or more second sets of images corresponding to the one or more second anomaly types for the object are augmented images.

In some implementations of the present technology, each augmented image is obtained by adding thereto an alteration selected from a random noise, a random cropping, a random rotation, a random set of white patches, a random set of black patches and a combination thereof.

In another aspect, various implementations of the present technology provide a system for identifying anomalies in an object, comprising:
- an image encoder;
- an anomaly encoder; and
- a training engine adapted to train the system by:
  - supplying, to the image encoder, one or more first sets of images corresponding to one or more first anomaly types for the object, the image encoder forming a model of the object in a latent space,
  - supplying labels to the anomaly encoder, each label corresponding to a respective image among the one or more first sets of images corresponding to the one or more first anomaly types for the object, each label identifying a related anomaly type for the object,
  - calculating, at the anomaly encoder, a vector containing a mean for each of one or more first model modes defined for the one of more first anomaly types,
  - calculating, at the anomaly encoder, a vector containing a standard deviation for each of the one or more first model modes defined for the one of more first anomaly types, and
  - calculating a log-likelihood loss for each of the one or more first anomaly types based on their respective mean and standard deviation; and
- the training engine being also adapted to retrain the system by:
  - supplying, to the image encoder, one or more second sets of images corresponding to one or more second anomaly types for the object, the image encoder updating the model of the object in the latent space,
  - supplying additional labels to the anomaly encoder, each additional label corresponding to a respective image among the one or more second sets of images corresponding to the one or more second anomaly types for the object, each label identifying a related anomaly type for the object,
  - updating, at the anomaly encoder, the vector containing the mean for each of the one or more first model modes defined for the one of more first anomaly types by adding a mean for each of one or more second model modes defined for the one or more second anomaly types,
  - updating, at the anomaly encoder, the vector containing the standard deviation for each of the one or more first model modes defined for the one of more first anomaly types by adding a standard deviation for each of one or more second model modes defined for the one or more second anomaly types,
  - supplying, to the latent space, a statistically sufficient sample of information contained in the vectors containing the means and standard deviations, and calculating a log-likelihood loss for each of the first and second anomaly types based on their respective mean and standard deviation.

In some implementations of the present technology, the system further comprises an image decoder, the image encoder implementing a first function; the image decoder implementing a second function, the second function being an inverse of the first function; and the image encoder and the image decoder sharing a common set of weights.

In some implementations of the present technology, the system further comprises an input interface operatively connected to the image encoder; and an output interface operatively connected to the decoder; the input interface being adapted to receive an input image of the object from an image source and to provide the input image to the image encoder; the image encoder being adapted to generate an image model based on the input image of the object; the image decoder being adapted to generate a decoded image of the object based on the image model; and the output interface being adapted to transmit the decoded image of the object to an image receiver.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
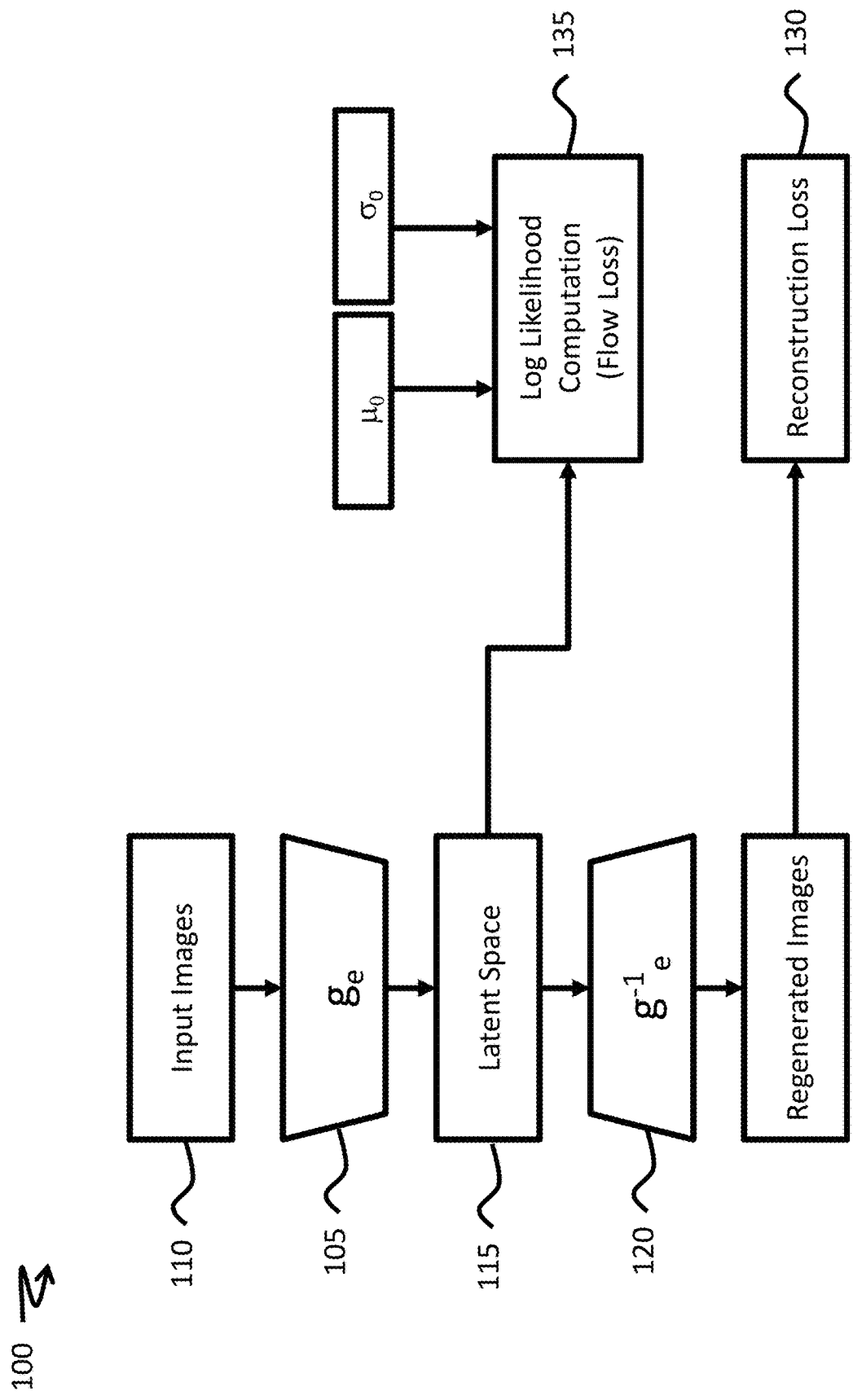
FIG. 1 is a block diagram of an anomaly detection system adapted to be trained in unsupervised mode in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that such modules may include for example, but without being limitative, computer program logic, computer program instructions, software, stack, firmware, hardware circuitry or a combination thereof which provides the required capabilities.

In one embodiment, the present technology may operate in unsupervised mode for identifying image anomalies. A system has been trained using a set of anomaly-free images of an object. Having learned a rich representation of the non-anomalous object, the system is able to receive an input image of a particular object that may contain anomalies, generate an image model and regenerate a substitute non-anomalous image of the object. An anomaly map, for example a heat-map, may be generated by comparing the input image and the regenerated image. Areas in the anomaly map that are associated with high probabilities represent parts of the object that most likely contain anomalies. The anomaly map may thus localize the anomalies defect while providing a confidence level for the detection of anomalies.

In another embodiment, the present technology may operate in semi-supervised mode. The system is trained in unsupervised mode using the set of anomaly-free images of the object, in the manner expressed in the previous paragraph. A classification head is added to the system. The classification head having been trained in supervised mode using a small label dataset of anomalous images of the object, it may predict with increased performance and accuracy a type of an anomaly in the input image of the particular object, directly from the generated image model. In an embodiment, the size of the label dataset may be much smaller than the set of anomaly-free images used for training in unsupervised mode. Therefore, this semi-supervised technique may be used both for anomaly detection with localization and for anomaly-type classification.

In a further embodiment, the present technology may use a continuous mode for training the system, both in the unsupervised and semi-supervised embodiments. Use of the continuous mode may allow the system to adapt to changes in the types of anomalies that may impact the imaged object.

With these fundamentals in place, we will now consider some non-limiting examples to illustrate various implementations of aspects of the present technology.

FIG. 1 is a block diagram of an anomaly detection system 100 adapted to be trained in unsupervised mode in accordance with an embodiment of the present technology. The system 100 includes an image encoder 105 that receives input images 110 and forms an image model for each input image 110. The image models are placed in a latent space 115. In more details, a neural network is used to extract a compact set of image features, smaller than the size of the original images, to form the image models placed in the latent space 115. In a non-limiting embodiment, the neural network may be based on a normalizing flow structure. Other non-limiting examples of techniques that may be used to place the image models in the latent space 115 may be found in Kobyzev, Ivan, Simon Prince, and Marcus Brubaker. "Normalizing flows: An introduction and review of current methods", IEEE Transactions on Pattern Analysis and Machine Intelligence (2020), and in Kingma, Durk P., and Prafulla Dhariwal. "Glow: Generative flow with invertible 1×1 convolutions", Advances in neural information processing systems (2018). An image decoder 120 produces regenerated images 125 based on the image models placed in the latent space 115.

In an embodiment, the image encoder 105 implements an encoding function $g_e$ and the image decoder 120 implements a decoding function $g_e^{-1}$, which is an inverse of the encoding function $g_e$. In the same or another embodiment, the image encoder 105 and the image decoder 120 are both constructed using a neural network and both share identical sets of weights.

The system 100 implements a single mode model, for example a flow-based model which, in an embodiment, is a generative normalizing flow-based model. The flow-based model may have a Gaussian distribution in which errors have null mean $\mu_0$ and a predetermined standard deviation $\sigma_0$.

The system 100 may be trained to detect anomalies on an image of an object. To this end, the image encoder 105 may be supplied with a plurality of input images 110 that are anomaly-free versions of the object. For example and without limitation, thousands or tens of thousands of such images may be used to train the system 100. The input images 110 may be augmented by the addition of alterations intended to enrich the flow-based model. Such alterations may comprise, without limitation, a random noise, a random cropping, a random rotation, a random set of white patches, a random set of black patches, and any combination thereof. Having been trained using augmented images, the system 100 will be more tolerant, at inference time, to the presence of noise in images of the object.

The system 100 calculates a reconstruction loss 130 using equation (1):

$$L_{recons}=|x-g^{-1}(g(x'))|_2 \tag{1}$$

Where x' is an augmented version of an original input image x. As expressed in equation (1), the system 100 calculates the reconstruction loss 130 based on a norm of differences between the original input image x and a reconstruction of its augmented version x'. Useful examples of the calculation of the norm may be found for example at https://mathworld.wolfram.com/L2-Norm.html.

The system 100 may also calculate a log-likelihood loss 135 based on a ratio of an output of a current layer of the flow-based model over an output of a previous layer of the flow-based model, as shown in equations (2) and (3):

$$\log p_\theta(x) = \log p_\theta(z) + \log\left|\det\left(\frac{dz}{dx}\right)\right| \tag{2}$$

$$\log p_\theta(x) = \log p_\theta(z) + \sum_{i=1}^{K}\log\left|\det\left(\frac{dh_i}{dh_{i-1}}\right)\right| \tag{3}$$

Where x is the input image, z is a latent variable, $p_\theta(x)$ is a probability contribution of x, $p_\theta(z)$ is a probability contribution of z, and is the derivative or an output or a layer $h_i$ with respect to an output of a previous layer $h_{i-1}$ of the neural network, which is formed of K layers.

The system 100 may further calculate a regularization loss (not shown), which includes in part a reverse of the log-likelihood loss 135. The regularization loss is calculated as shown in equation (4):

$$L_{reg} = \sum_{k=1}^{K} \log\left|\det\left(\frac{dh_i}{dh_{i-1}}\right)\right| \tag{4}$$

The system 100 is trained using the reconstruction loss 130 and may further be trained using the log-likelihood loss 135 and the regularization loss, following which the system 100 is ready to identify anomalies in a particular object similar to the anomaly-free object. This training process is sometimes called "optimization through backpropagation", a technique that has been used for training various types of neural networks. In this process, the gradient of the loss with respect to each layer in the neural network is computed and is used to update the corresponding weights in that layer. More information may be found in https://en.wikipedia.org/wiki/Backpropagation. It may also be noted that several open-source deep-learning libraries are currently available. These libraries package various types of optimization algorithms that may be used as a part of the present technology. In a non-limiting embodiment, a PyTorch library (https://en.wikipedia.org/wiki/PyTorch) may be used to implement and train the system 100.

Figure 2:
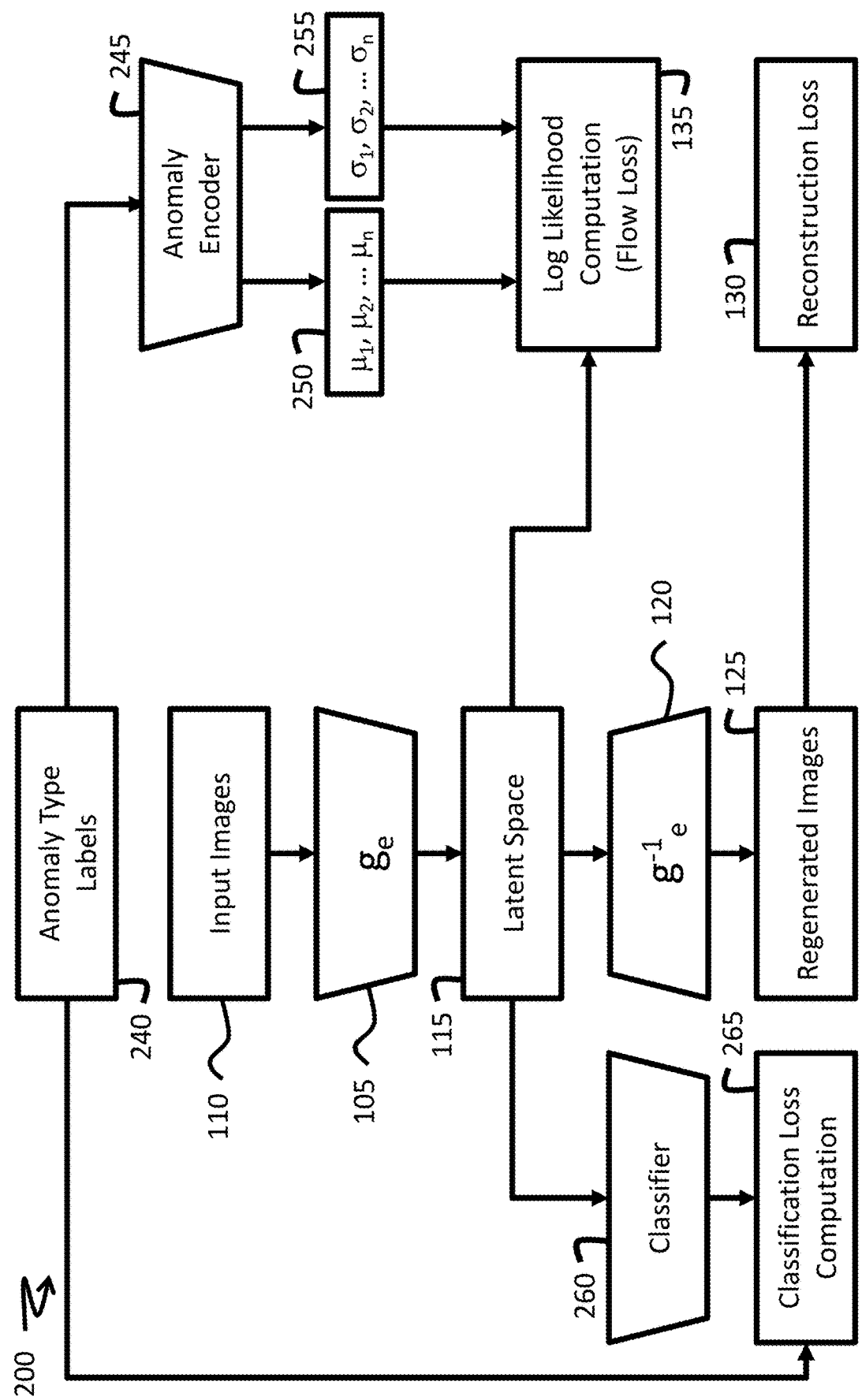
FIG. 2 is a block diagram of an anomaly detection system adapted to be trained in semi-supervised mode in accordance with an embodiment of the present technology.

FIG. 2 is a block diagram of an anomaly detection system 200 adapted to be trained in semi-supervised mode in accordance with an embodiment of the present technology. The system 200 includes all components of the system 100, which are not described further except where these components may include additional functions. The system 200 implements a multi-mode model, having one mode for each of one or more anomaly types that might be found in instances of the object. Non-limiting examples of anomaly types may include one or a combination of a scratch, a crack, a color, a spot, a hole, and a discoloration present in some instances of the object. Generally speaking, these anomalies will have been detected in an industrial context where the object is produced or tested and where anomalies of these types have occurred. The system 200 is particularly efficient in identifying anomalies defined in the one or more anomaly types.

To this end, one or more sets of anomalous images of the object are supplied to the image encoder 105. These images contain anomalies corresponding to one or more known anomaly types for the object. The images containing the anomalies may be augmented, in the same manner as described hereinabove, before being supplied to the image encoder 105. In some embodiments, a small number of anomalous images may be supplied to the image encoder 105, for example 10 to 20 images or so for each anomaly type. The system 200 also includes a supplier 240 of anomaly type labels. The supplier 240 may provide labels to an anomaly encoder 245, which is another neural network that gets trained end-to-end with the rest of the system 100. Each label provided to the anomaly encoder 245 corresponds to a given one of the anomalous images of the object and identifies a related anomaly type.

Using the labels, the anomaly encoder 245 generates a vector 250 containing a mean $\{\mu_0, \mu_1, \ldots, \mu_n\}$ for each of the one of more anomaly types and another vector 255 containing a standard deviation $\{\sigma_0, \sigma_1, \ldots, \sigma_n\}$ for each of the one of more anomaly types. The mean and standard deviations are predicted by the anomaly encoder 245. The anomaly encoder 245 takes a given anomaly type as an input, and outputs the mean and standard deviation for the given anomaly type. During the training, the anomaly encoder 245 parametrizes the probability contribution $p_\theta$ of equations (2) and (3) using these mean and standard deviation values. A log-likelihood loss 135 may be calculated for each of the modes.

The system 200 may be trained in the same manner as expressed in relation to the system 100 and may further be trained using the one or more sets of anomalous images supplied to the image encoder 105, also using the means of the vectors 250 and 255 supplied to the latent space in the calculation of the log likelihood loss 135. The system 200 may define one of more flow-based models for the one of more anomaly types. Hence, the anomalous images are mapped to the latent space 115 and the labels are mapped to the vectors 250 and 255.

Additionally, the system 200 may comprise a classifier 260 that is supplied with the labels from the supplier 240 and with at least some of the content of the latent space 115. The classifier 260 may use the content of the latent space 115 to generate classification information for each anomaly type. The latent space 115 contains a set of extracted features at the output of the encoder 105. The classifier 260 may take these features as input and pass them through another neural network (not shown) that classifies each anomaly type. This neural network is also trained end-to-end with the rest of the system 200 at the training time.

The classifier 260 may further use the labels identifying the one or more anomaly types to calculate a classification loss 265 for each of the anomaly types. The system 200 may further be trained using the one or more classification losses 265 calculated for the one or more anomaly types. The classification loss 265 may, for example and without limitation, be calculated as expressed in https://en.wikipedia.org/wiki/Cross entropy, the disclosure of which is incorporated by reference herein.

Figure 3:
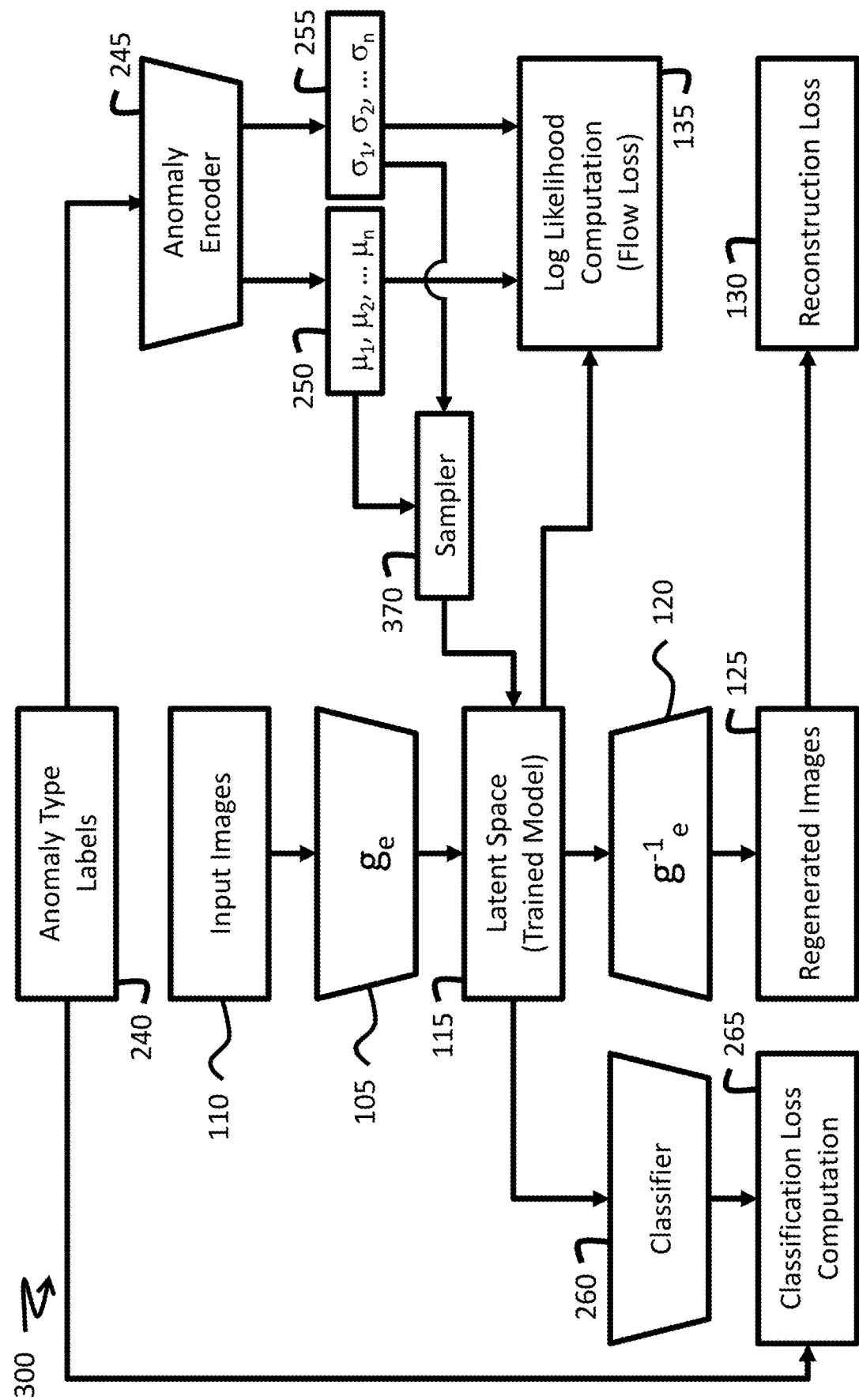
FIG. 3 is a block diagram of an anomaly detection system adapted to be trained in semi-supervised mode and retrained using a continuous learning feature in accordance with an embodiment of the present technology.

FIG. 3 is a block diagram of an anomaly detection system 300 adapted to be trained in semi-supervised mode and retrained using a continuous learning feature in accordance with an embodiment of the present technology. The system 300 includes all components of the systems 100 and 200, which are not described further except where these components may include additional functions. Like the system 200, the system 300 also implements a multi-mode model, having one mode for each of one or more anomaly types that may be present in the object. The system 300 may initially be trained in semi-supervised mode in the same manner as expressed in relation to the description of the system 200, following which a trained model comprising encoded original anomaly types is present in the latent space 115.

In the industrial context where the object is produced or tested, new anomaly types may be detected after a few weeks or a few months of production. When new anomaly types are identified for the object, one or more new sets of anomalous images of the object are supplied to the image encoder 105. These images contain anomalies corresponding to one or more new anomaly types for the object. The images containing the new anomalies may also be augmented before being supplied to the image encoder 105. The supplier 240 provides new labels to the anomaly encoder 245, each new label corresponding to a given one of the new anomalous images of the object and identifying a related new anomaly type.

The anomaly encoder 245 generates a new version of the vector 250 containing a mean $\{\mu_0, \mu_1, \ldots, \mu_n\}$ for each of the original and new anomaly types and a new version of the vector 255 containing a standard deviation $\{\sigma_0, \sigma_1, \ldots, \sigma_n\}$ for each of the original and new anomaly types.

The system 300 further includes a sampler 370 that collects sufficient information from the vectors 250 and 255 to statistically represent at least the original anomaly types. Collecting sufficient information from the vectors 250 and 255 to statistically represent the new anomaly types is also contemplated. In an embodiment, this information may be randomly sampled. The information obtained by the sampler 370 and related to the original anomaly types is provided to the latent space 115. A log-likelihood loss 135 is calculated for each of the new anomaly types, for example using equations (2) and/or (3), in view of retraining the system 300. The one or more new sets of images of the object that contain new anomalies a supplied the image encoder 105 to populate the latent space 105.

Other components of the system 300 operate in the same manner as in the case of the system 200. Following retraining of the system 300, the model in the latent space 115 provides substantially the same level of detection accuracy for both the original and the new anomaly types.

Figure 4:
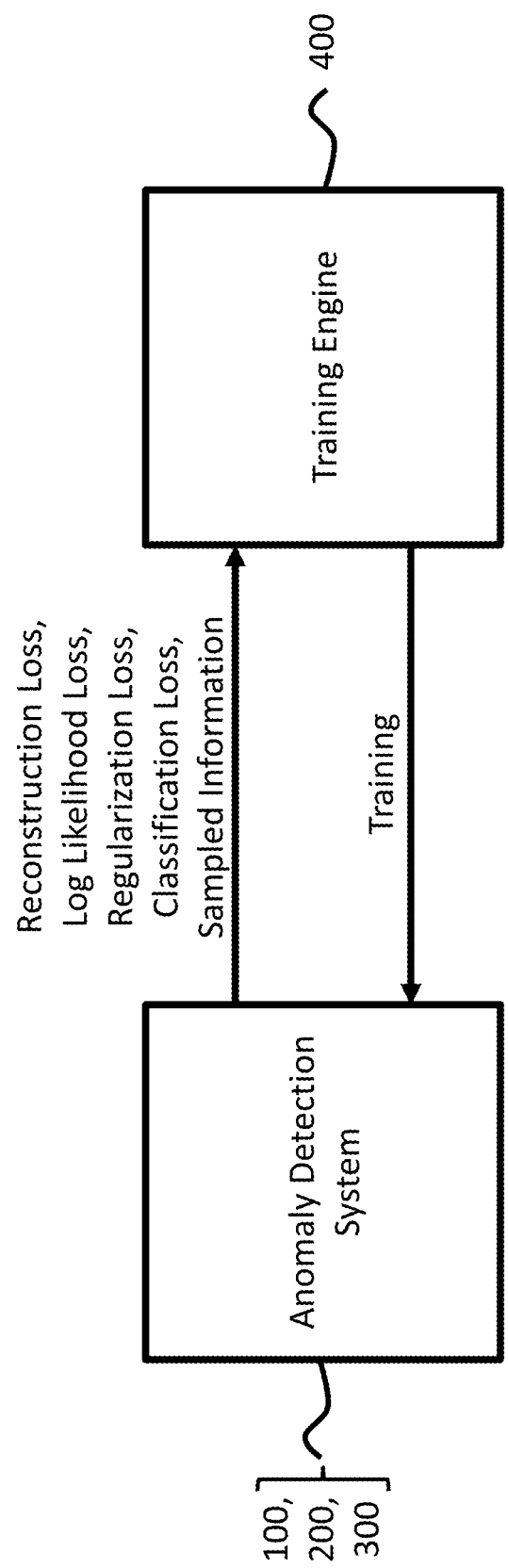
FIG. 4 is a block diagram showing interactions between the anomaly detection system of any one of FIGS. 1, 2 and 3 and a training engine in accordance with an embodiment of the present technology.

FIG. 4 is a block diagram showing interactions between the anomaly detection system 100, 200, 300 of FIGS. 1, 2 and 3, respectively, and a training engine 400 in accordance with an embodiment of the present technology. Although not shown on FIGS. 1, 2 and 3, a training engine 400 operates in cooperation with the system 100, 200 or 300 while it is being trained. Figuratively speaking, the components of the systems 100, 200 and 300 may be viewed as being in an operational plane while the training engine 400 may be viewed as being in a training plane superimposed on the operational plane. The training engine 400 is not used for generating image models or for forming substitute non-anomalous images. Otherwise stated, the training engine 400 is not used at inference time.

The training engine 400 obtains values for the reconstruction loss 130, the log likelihood loss 135 and the regularization loss from the systems 100, 200 or 300. The training engine 400 may also obtain values for the classification loss 265 from the systems 200 or 300. The training engine may further obtain, from the sampler 370, information obtained by sampling the vectors 250 and 255 related to known anomaly types. Sufficient information is obtained by sampling the vectors 250 and 255 to statistically represent at least the original anomaly types. Collecting sufficient information from the vectors 250 and 255 to statistically represent the new anomaly types is also contemplated. In response, the training engine 400 provides training to the systems 100, 200 and 300. Impacts of the training is implemented in the latent space 115 of the systems 100, 200 and 300.

Figure 5:
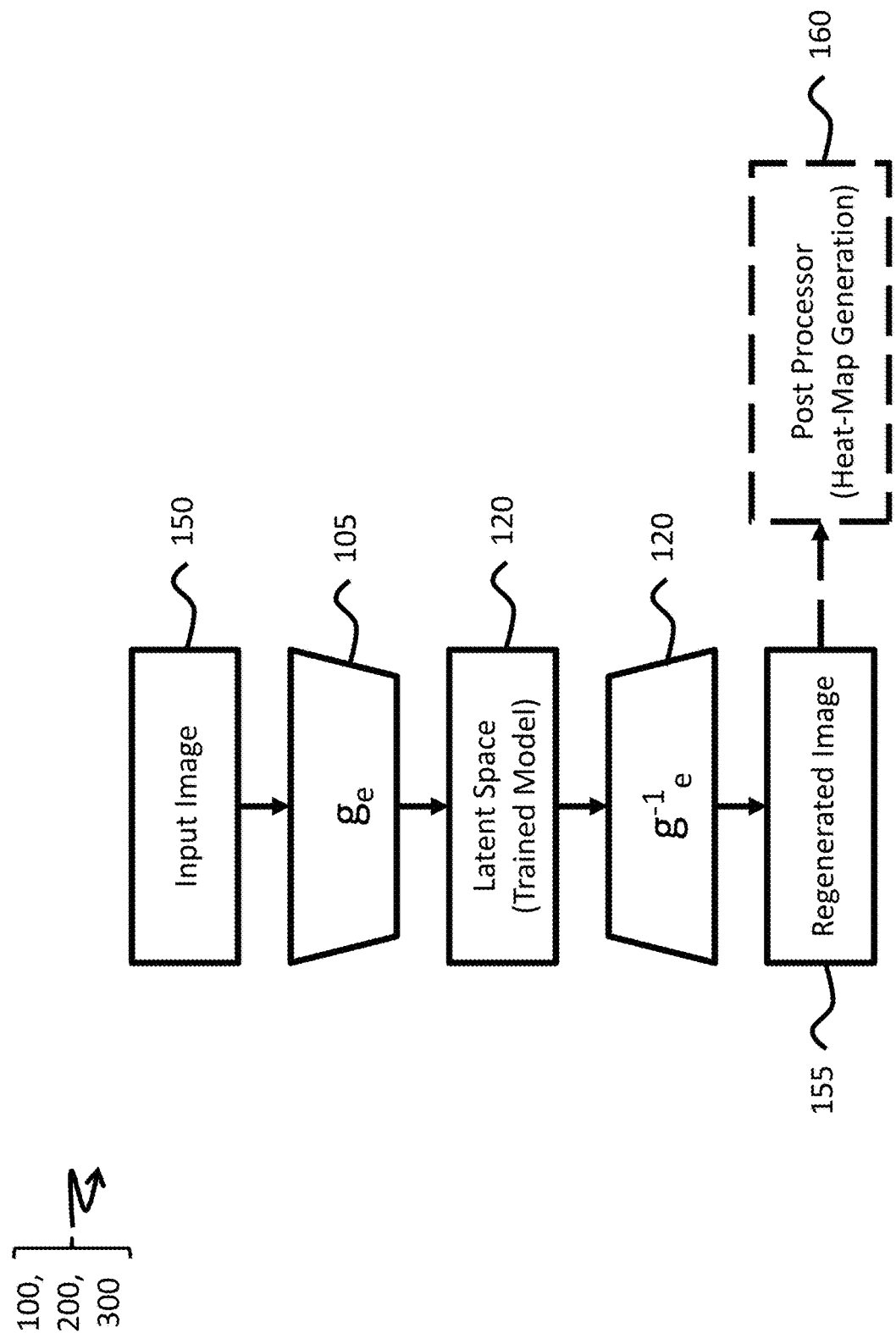
FIG. 5 is the anomaly detection system of any one of FIGS. 1, 2 and 3 in use for identifying anomalies in an object in accordance with an embodiment of the present technology.

FIG. 5 is the anomaly detection system 100, 200 or 300 of any one of FIGS. 1, 2 and 3 in use for identifying anomalies in an object in accordance with an embodiment of the present technology. In operation, the systems 100, 200 and 300 are used in the same manner for identifying zero or more anomalies in an input image 150 of the object, with performance levels that may vary according to the type of training used in these systems.

The image encoder 105 converts the input image 150 into an image model placed in the latent space 115. The latent space 115 has been trained to include a trained model of the object, the trained model consisting of a single-mode model (system 100) or a multi-mode model (systems 200 and 300), as expressed hereinabove. The decoder 120 converts the image model to produce a regenerated image 155, which is a substitute non-anomalous image of the object.

A post-processor 160 may compare the input image 150 and the regenerated image 155 to produce an anomaly map identifying zero of more areas of the input image 150 of the object that contain the zero or more anomalies. In a non-limiting embodiment, the anomaly map may be presented as a heat-map in which distinct colors or shades reflect corresponding anomaly probabilities in the input image 150 of the object. For example and without limitation, heuristics may be used to detect the zero or more anomalies present in the input image 150. As such, an anomaly may be detected when an area of the heat-map shows color or illumination values that are higher than a detection threshold.

Figure 6:
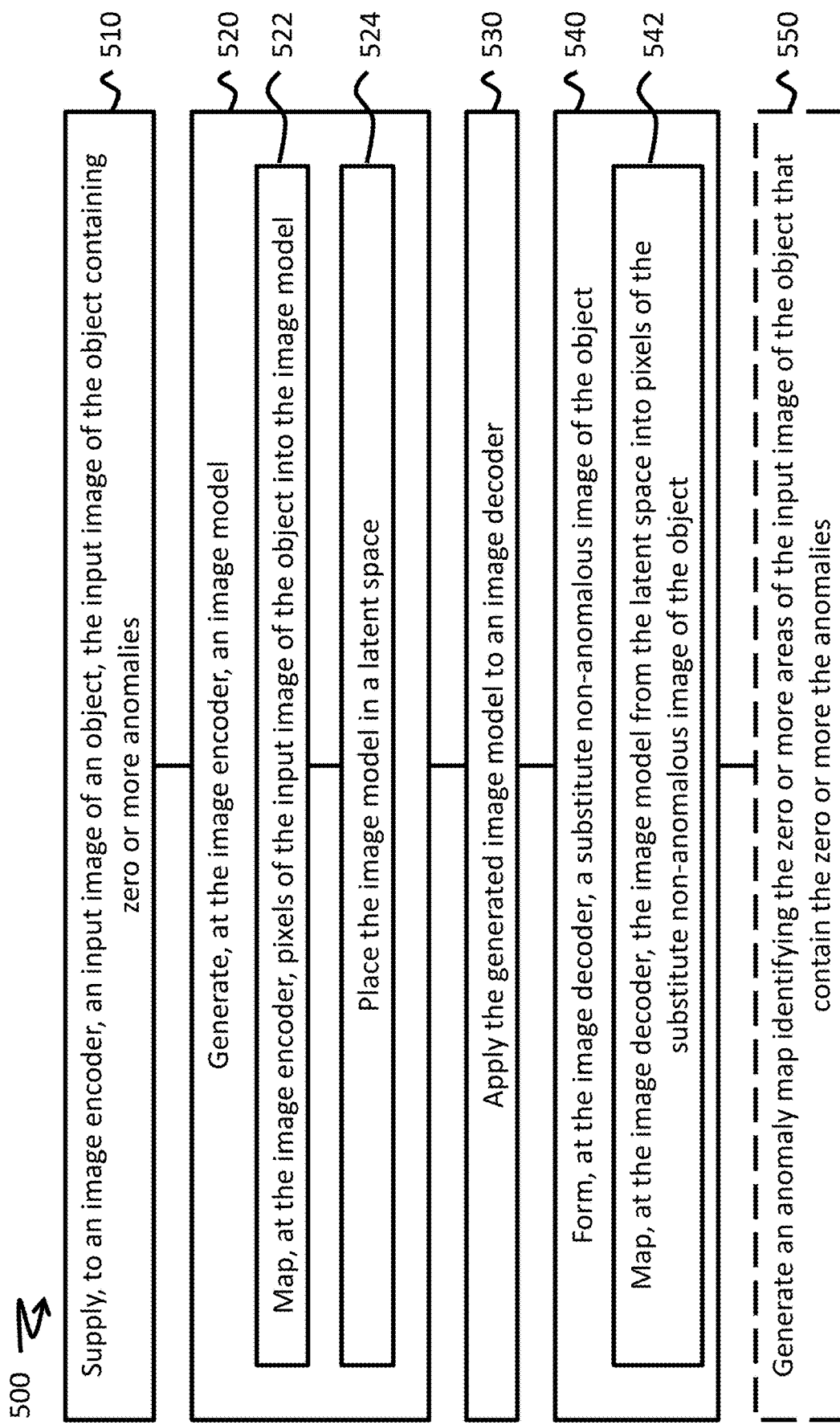
FIG. 6 is a sequence diagram showing operations of a method for identifying anomalies in an object in accordance with an embodiment of the present technology.

FIG. 6 is a sequence diagram showing operations of a method for identifying anomalies in an object in accordance with an embodiment of the present technology. In an embodiment, the method may be a computer-implemented method. On FIG. 6, a sequence 500 comprises a plurality of operations, some of which may be executed in variable order, some of the operations possibly being executed concurrently, some of the operations being optional. Initially, the system 100, 200 or 300 has been trained using (a) a set of augmented anomaly-free images of the object applied at the image encoder and (b) a reconstruction loss calculated based on a norm of differences between each augmented anomaly-free image of the object and a corresponding output image from the image decoder. The system 200 or 300 may further have been trained using one or more sets of augmented anomalous images and using corresponding labels.

The sequence 500 may begin at operation 510 by supplying, to the image encoder 105, an input image 150 of the object, the input image 150 of the object containing zero or more anomalies. At operation 520, the image encoder 105 generates an image model. Operation 520 may include one or more sub-operations 502 and 504. In sub-operation 502, the image encoder 105 maps pixels of the input image 150 of the object into the image model. At sub-operation 504, the image encoder 105 places the image model in the latent space 115.

The generated image model to is applied to the image decoder 120 at operation 530. Then at operation 540, the image decoder 120 forms the regenerated image 155, which is a substitute non-anomalous image of the object. Operation 540 may include sub-operation 542, in which the image decoder 120 maps the image model from the latent space 115 into pixels of the substitute non-anomalous image of the object.

Optionally, the sequence 500 may include a post-processing operation that generates an anomaly map identifying the zero or more areas of the input image of the object that contain the zero or more anomalies. The anomaly map may identify zero or more areas of the input image of the object that contain the zero or more the anomalies. In an embodiment, the anomaly map is a heat-map in which distinct colors or shades reflect corresponding anomaly probabilities in the input image of the object.

Figure 7:
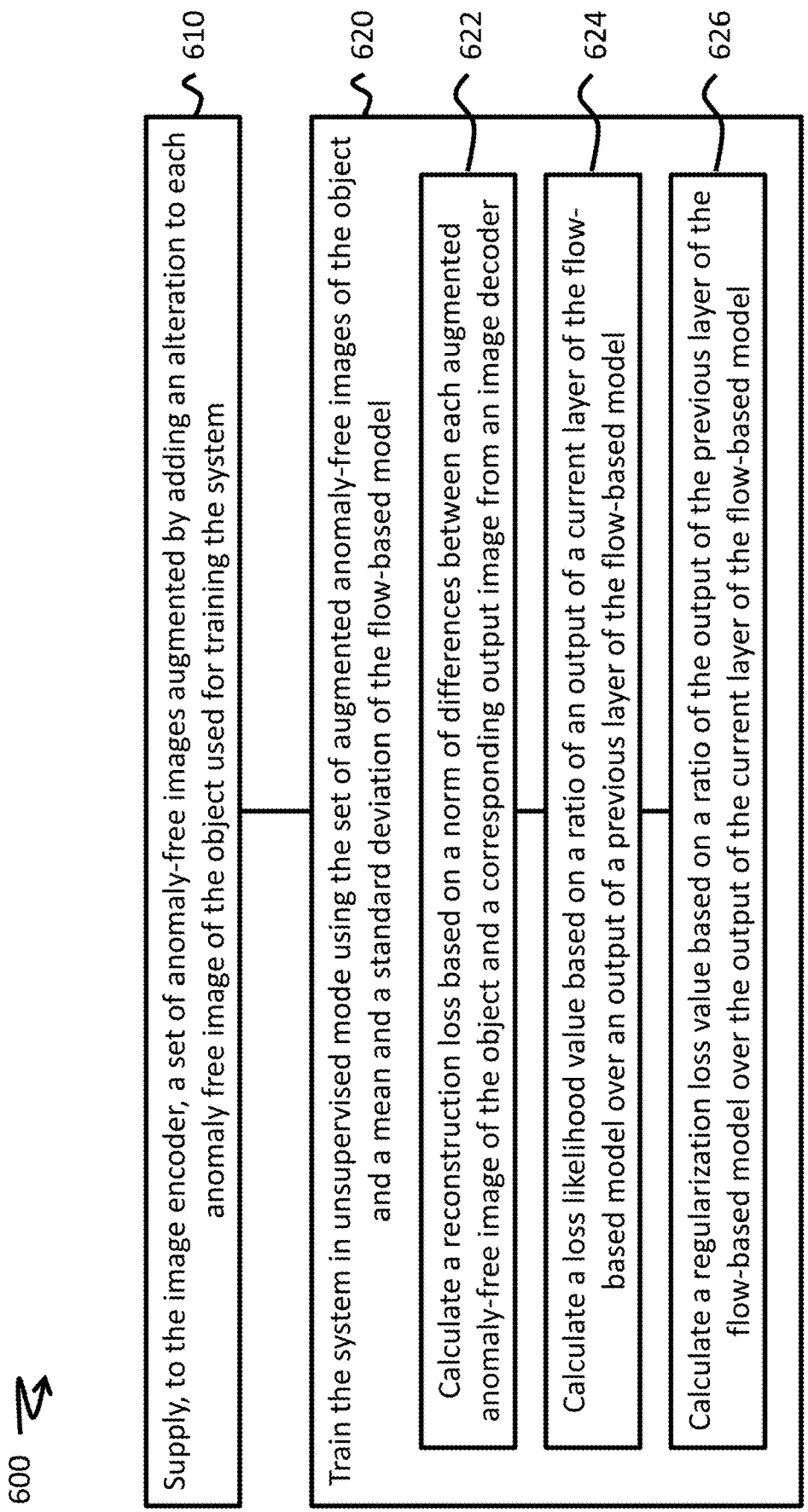
FIG. 7 is a sequence diagram showing operations of a method for training the anomaly detection system of FIG. 1 in an object in accordance with an embodiment of the present technology.

FIG. 7 is a sequence diagram showing operations of a method for training the anomaly detection system of FIG. 1 in an object in accordance with an embodiment of the present technology. On FIG. 7, a sequence 600 comprises a plurality of operations, some of which may be executed in variable order, some of the operations possibly being executed concurrently, some of the operations being optional. The sequence 600 includes operations aimed at training the system 100 in unsupervised mode. Of course, the systems 200 and 300 may be also be trained in unsupervised mode, although such training mode would not allow to use the full potential of these systems.

At operation 610, a set of anomaly-free images is supplied to the image encoder 105. The anomaly-free images may be augmented by adding an alteration to each of a plurality of anomaly free images 110 of the object that are used for training the system 100. Each anomaly-free image may be augmented, for example and without limitation, by adding thereto one or more alterations such as a random noise, a random cropping, a random rotation, a random set of white patches and a random set of black patches.

The system 100 is then trained, at operation 620, using the set of augmented anomaly-free images of the object a mean and a standard deviation of the flow-based model. In an embodiment, the flow-based model may be in the form of a Gaussian model in which errors have a null mean and a predetermined standard deviation. Operation 620 may include one or more sub-operations 620, 622, 624 and 626.

At sub-operation 622, a reconstruction loss may be calculated based on a norm of differences between each augmented anomaly-free image of the object and a corresponding output image from an image decoder. At sub-operation 624, a loss likelihood may be calculated based on a ratio of an output of a current layer of the flow-based model over an output of a previous layer of the flow-based model. At sub-operation 626, a regularization loss may be calculated based on a ratio of the output of the previous layer of the flow-based model over the output of the current layer of the flow-based model. Generally speaking, the training engine 400 may use one of more of these loss values in training the system 100, forming a trained model in the latent space 115.

Figure 8A:
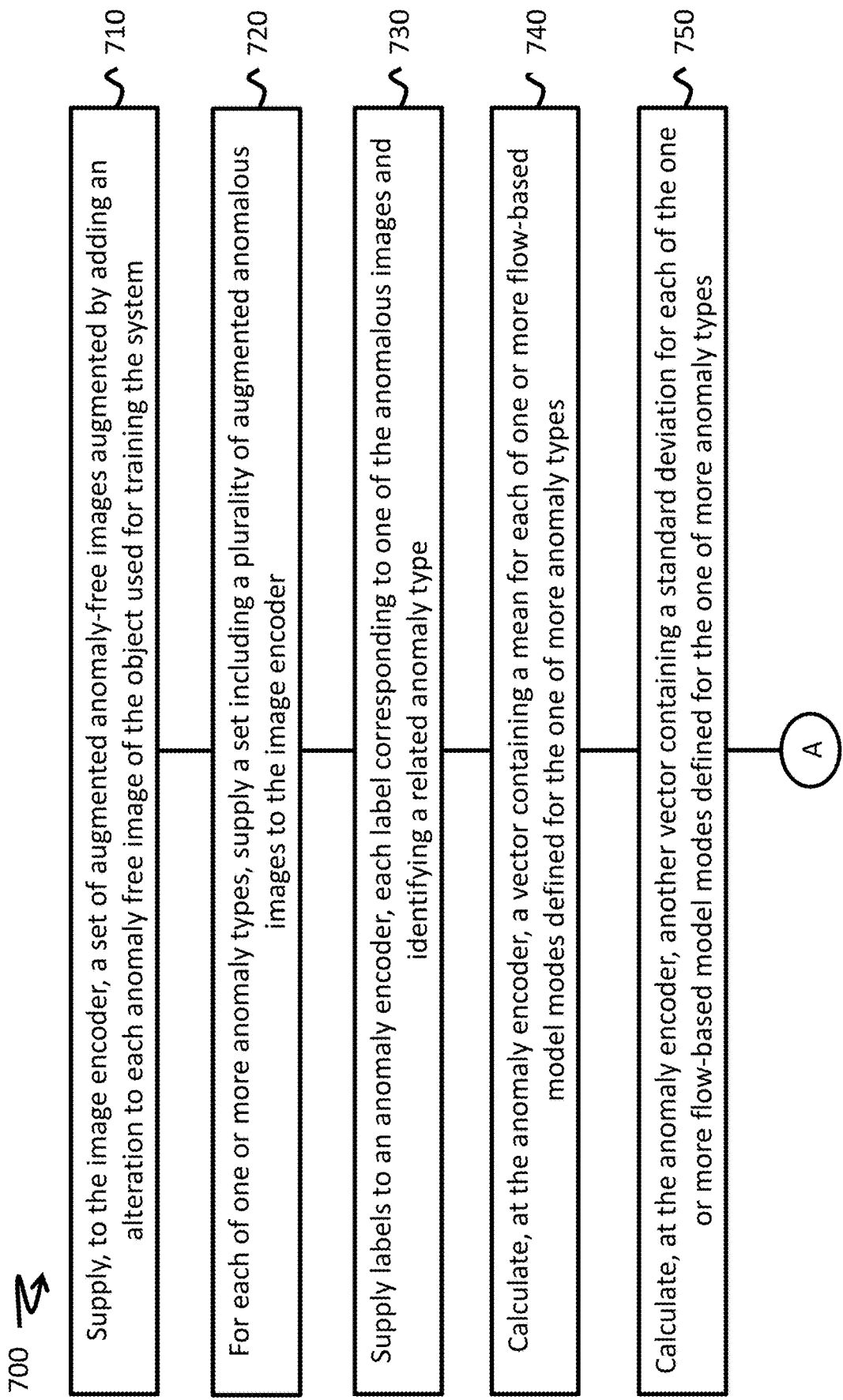
FIGS. 8a and 8b are a sequence diagram showing operations of a method for training the anomaly detection system of FIG. 2 or 3 in an object in accordance with an embodiment of the present technology.
Figure 8B:
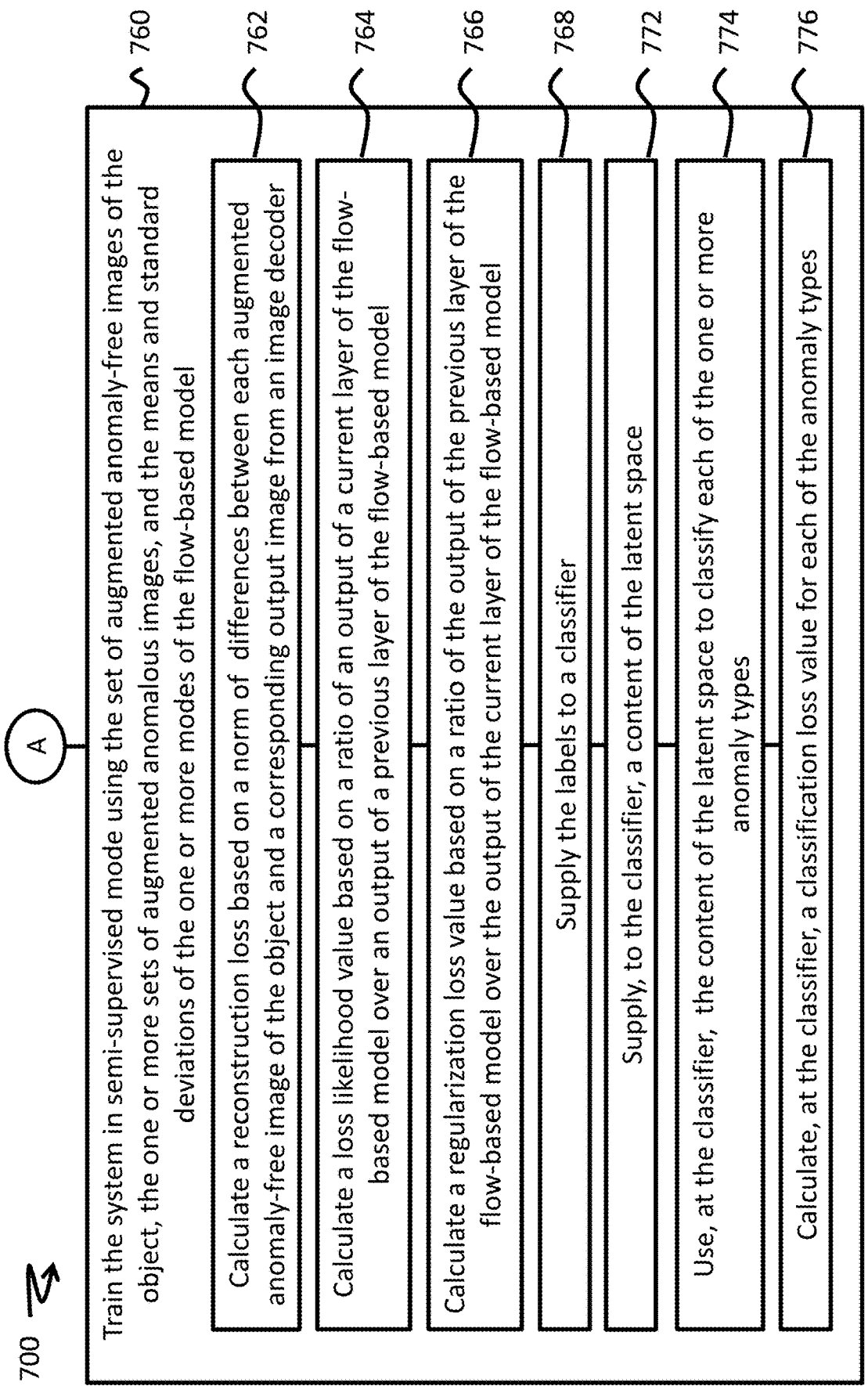

FIGS. 8a and 8b are a sequence diagram showing operations of a method for training the anomaly detection system of FIG. 2 or 3 in an object in accordance with an embodiment of the present technology. On FIGS. 8a and 8b, a sequence 700 comprises a plurality of operations, some of which may be executed in variable order, some of the operations possibly being executed concurrently, some of the operations being optional. The sequence 700 includes operations aimed at training the systems 200 and 300 in semi-unsupervised mode.

As shown on FIG. 8a, a set of augmented anomaly-free images is formed, at operation 710, by adding an alteration to each anomaly free image of the object used for training the system 200 or 300. Operation 710 may be the same or equivalent to operation 610 of FIG. 7. A set of augmented anomalous images is supplied to the image encoder 105 for each of one or more anomaly types at operation 720. At operation 730, labels are supplied to the anomaly encoder 245, each label corresponding to one of the anomalous images and identifying a related anomaly type. Non-limiting examples of anomaly types may include one or a combination of a scratch, a crack, a color, a spot, a hole, and a discoloration. Given that one or more anomaly types are defined, the resulting flow-based model may comprise one or more modes, each mode of the flow-based model corresponding to one of one or more anomaly types, each mode having a corresponding mean and a corresponding standard deviation. At operation 740, the anomaly encoder 245 calculates a vector containing a mean for each of one or more flow-based model modes defined to correspond to the one of more anomaly types. Similarly, at operation 750, the anomaly encoder 245 calculates another vector containing a standard deviation for each of the one or more flow-based model modes defined for the one of more anomaly types.

Continuing on FIG. 8b, the system 200 or 300 is trained in semi-supervised mode at operation 760, using the set of augmented anomaly-free images of the object and the one or more sets of augmented anomalous images applied to the image encoder 105, the training also using the means and standard deviations of the one or more modes of the flow-based model. Operation 760 may include one or more sub-operations 762, 764, 766, 768, 772, 774 and 776.

At sub-operation 762, a reconstruction loss may be calculated based on a norm of differences between each augmented anomaly-free image of the object and a corresponding output image from an image decoder. A loss likelihood may be calculated at sub-operation 764 based on a ratio of an output of a current layer of the flow-based model over an output of a previous layer of the flow-based model. A regularization loss may be calculated at sub-operation 766 based on a ratio of the output of the previous layer of the flow-based model over the output of the current layer of the flow-based model At sub-operation 768, the labels may be supplied to the classifier 260. At sub-operation 772, the classifier 260 may be supplied with a content of the latent space 115. The classifier 260 may use the content of the latent space 115 to classify each of the one or more anomaly types at sub-operation 774. At sub-operation 776, the classifier 260 may calculate a classification loss for each of the anomaly types.

As expressed in the description of the sequence 600, the training engine 400 may use one of more of the loss values calculated at operation 760 and in its sub-operations for training the system 200 or 300, forming a trained model in the latent space 115. The training engine 400 may further use classification values obtained from the classifier 260 in training the system 200 or 300.

Figure 9A:
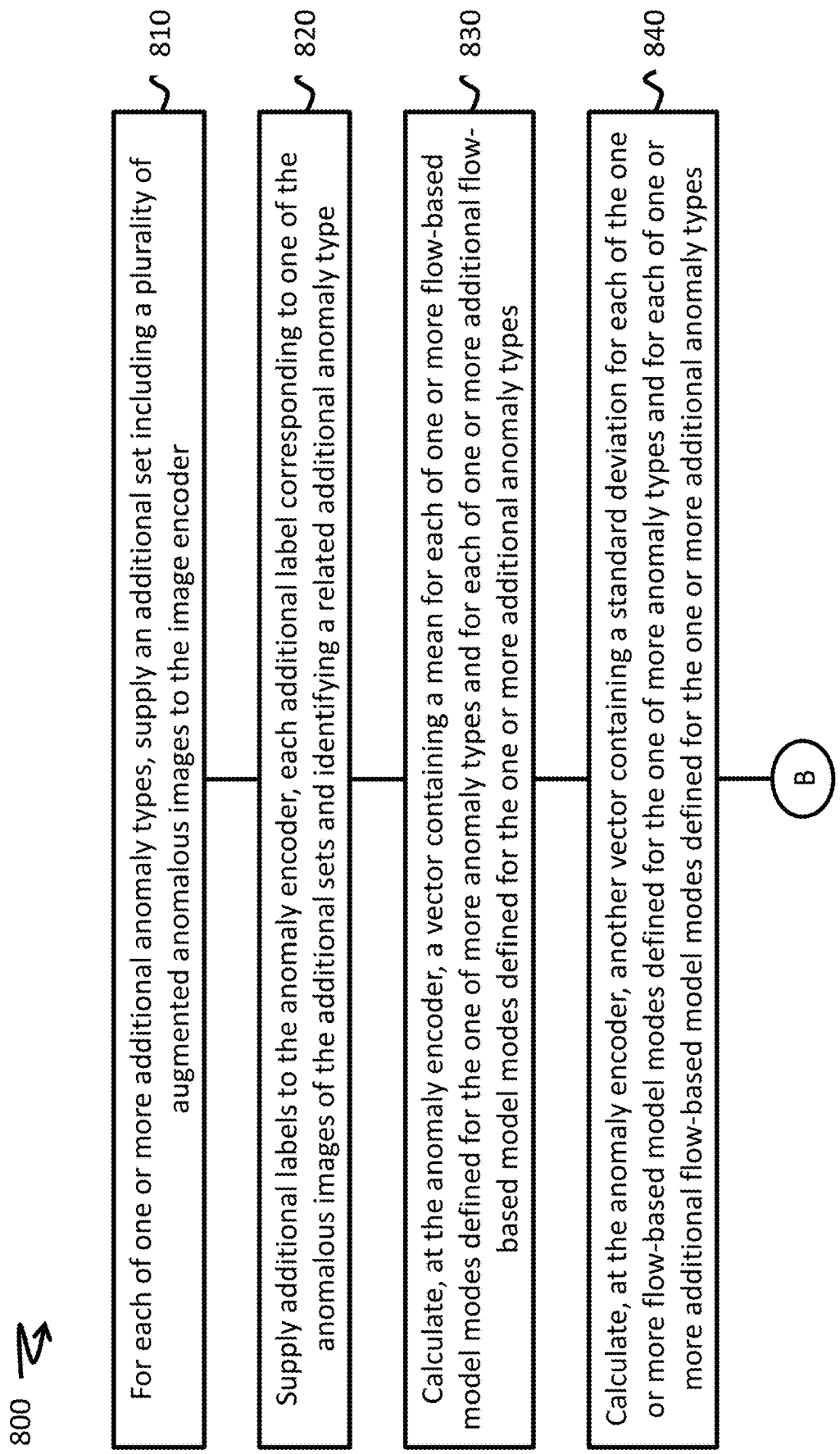
FIGS. 9a and 9b are a sequence diagram showing operations of a method for retraining the anomaly detection system of FIG. 3 in an object in accordance with an embodiment of the present technology.
Figure 9B:
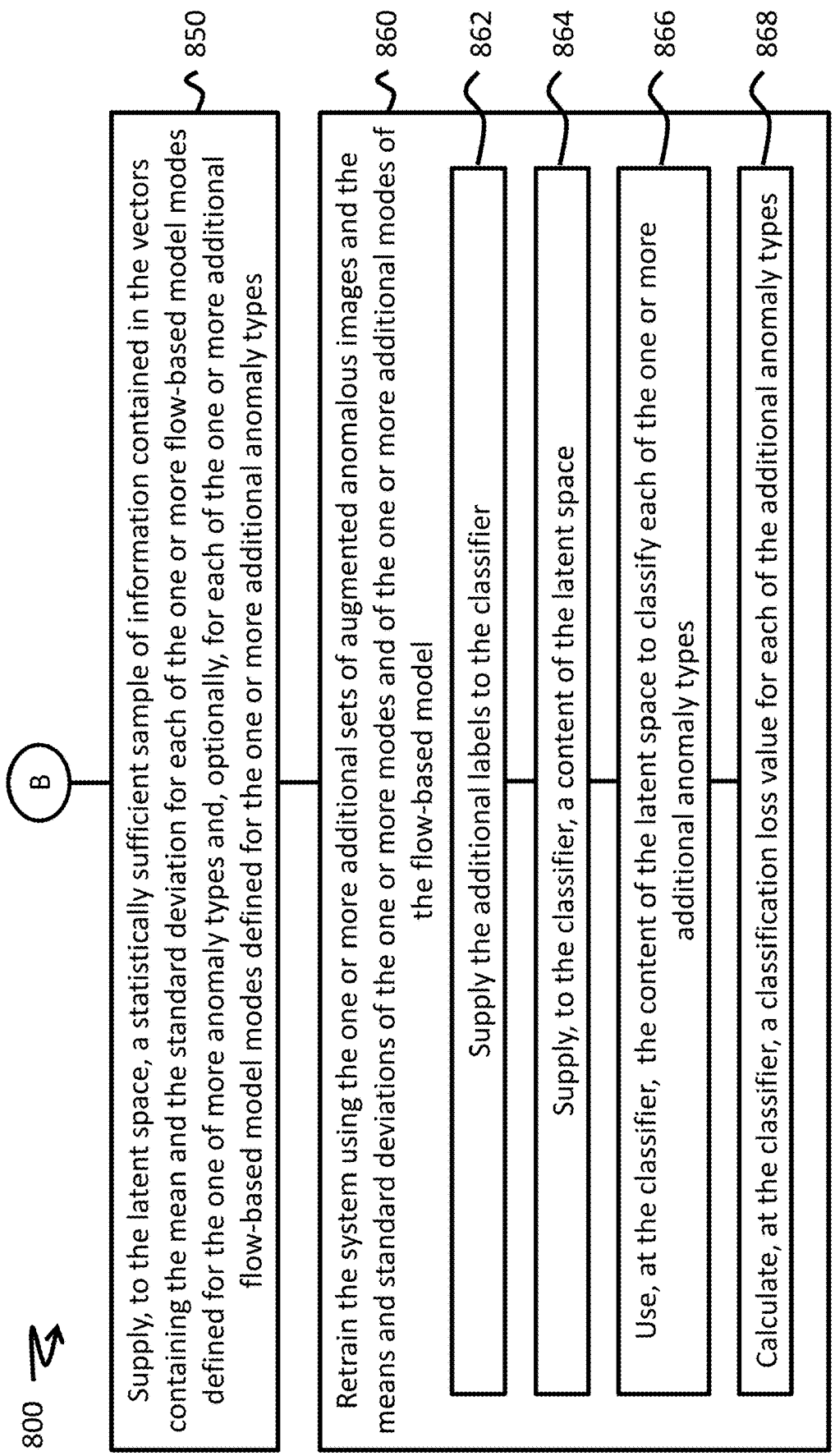

FIGS. 9a and 9b are a sequence diagram showing operations of a method for retraining the anomaly detection system of FIG. 3 in an object in accordance with an embodiment of the present technology. On FIGS. 9a and 9b, a sequence 800 comprises a plurality of operations, some of which may be executed in variable order, some of the operations possibly being executed concurrently, some of the operations being optional. The sequence 800 includes operations aimed at retraining the system 300 after it has been initially trained using the operations of the sequence 700.

As shown on FIG. 9a, at operation 810, an additional set of augmented anomalous images is supplied to the image encoder 105 for each of one or more additional anomaly types. At operation 820, the anomaly encoder 245 is supplied with additional labels, each additional label corresponding to one of the anomalous images of the additional sets and identifying an additional anomaly type. Usually, the additional anomaly types will differ from those used in the initial training of the system 300. However, retraining of the system 300 will operate correctly in case some anomaly types are repeated in the set of additional anomaly types.

At operation 830, the anomaly encoder 245 calculates a vector containing a mean for each of the one or more flow-based model modes defined to correspond to the one of more anomaly types and to each of one or more additional flow-based model modes defined for the one or more additional anomaly types. Similarly, at operation 840, the anomaly encoder 245 calculates another vector containing a standard deviation for each of the one or more flow-based model modes defined to correspond to the one of more anomaly types and to each of one or more additional flow-based model modes defined for the one or more additional anomaly types.

Continuing on FIG. 9b, at operation 850, a statistically sufficient sample of information contained in the vectors that contain the mean and the standard deviation for each of the one or more flow-based model modes defined for the one of more anomaly types and, optionally, for each of the one or more additional flow-based model modes defined for the one or more additional anomaly types is supplied to the latent space 115. The system 300 is retrained at operation 860 using the one or more additional sets of augmented anomalous images applied to the image encoder 105, the training also using and the means and standard deviations of the one or more modes of the flow-based model. In an embodiment, operation 860 may be similar or equivalent to operation 760 and may include some or all of the same sub-operations 762, 764, 766, 768, 772, 774 and 776. In particular, operation 860 may include one or more sub-operations 862, 864, 866 and 868.

At sub-operation 862, the additional labels may be supplied to the classifier 260. At sub-operation 864, the classifier 260 may be supplied with a content of the latent space 115. The classifier 260 may use the content of the latent space 115 to classify each of the one or more additional anomaly types at sub-operation 866. At sub-operation 868, the classifier 260 may calculate a classification loss for each of the additional anomaly types.

As expressed in the description of the previous sequences, the training engine 400 may use one of more of the loss values calculated at operation 860 and in its sub-operations for retraining the system 300 by updating the trained model in the latent space 115. In an embodiment, the various operations of the sequence 800 may be executed to retrain the system 300 without causing any downtime of the system 300.

While the sequence 800 has been described in relation to the flow-based model as described in relation to the systems 100, 200 and 300, the same or equivalent continuous training method may be applied to other systems that are designed to identify anomalies in an image of an object. The technology used in the sequence 800 may be generalized to apply to other systems in which an anomaly encoder forms a model of the object in a latent space, for example and without limitation the flow-based model of the systems 100, 200 and 300, a generative adversarial network model or a variational autoencoder model. In at least some embodiments, classification information for each of the one or more anomaly types and for each of the one or more additional anomaly types may be used when forming and updating the model of the object in the latent space.

Figure 10:
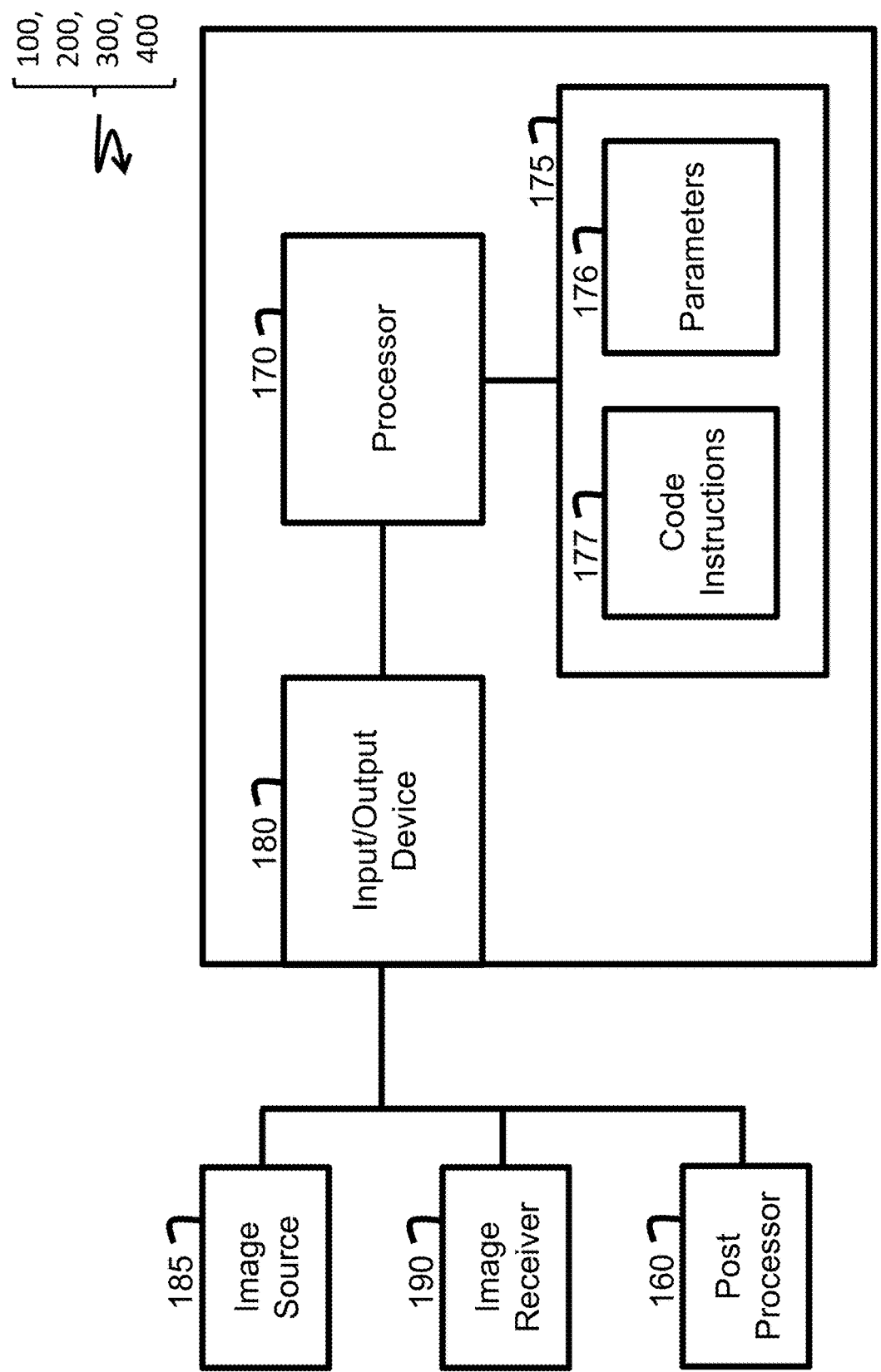
FIG. 10 is a block diagram showing internal components of the anomaly detection system according to any one of FIGS. 1, 2 and 3 in accordance with an embodiment of the present technology.

Each of the operations of the sequences 500, 600, 700 and/or 800 may be configured to be processed by one or more processors, the one or more processors being coupled to a memory device. For example, FIG. 10 is a block diagram showing internal components of the anomaly detection system 100, 200 or 300 according to any one of FIGS. 1, 2 and 3 in accordance with an embodiment of the present technology. The system 100, 200 or 300 comprises a processor or a plurality of cooperating processors (represented as a processor 170 for simplicity), a memory device or a plurality of memory devices (represented as a memory device 175 for simplicity), an input/output device or a plurality of input/output devices (represented as an input/output device 180 for simplicity), allowing the system 100, 200 or 300 to receive the input images 110 and 150 from an image source 185, to transmit the regenerated images 125 and 155 to an image receiver 190 and, optionally, to communicate with the post-processor 160. Separate input devices and output devices (not shown) may be present instead of the input/output device 180. The processor 170 is operatively connected to the memory device 175 and to the input/output device 180. The memory device 175 includes a storage 176 for storing parameters, including for example the latent space 115. The memory device 175 may comprise a non-transitory computer-readable medium 177 for storing instructions that are executable by the processor 175 to cause the processor 170 to execute the various functions and features of the system 100, 200 or 300, including the operations of the sequences 500, 600, 700 and/or 800.

The training engine 400 may be implemented jointly with the system 100, 200 or 300, sharing the same processor 170 and the same memory device 175, which may be further adapted to perform the various features of the training engine 400 introduced in the description of FIG. 4. Alternatively, the training engine 400 may be implemented in a separate physical entity having its own processor and memory device, also including an input/output device allowing interoperability with the system 100, 200 or 300.

Figure 11:
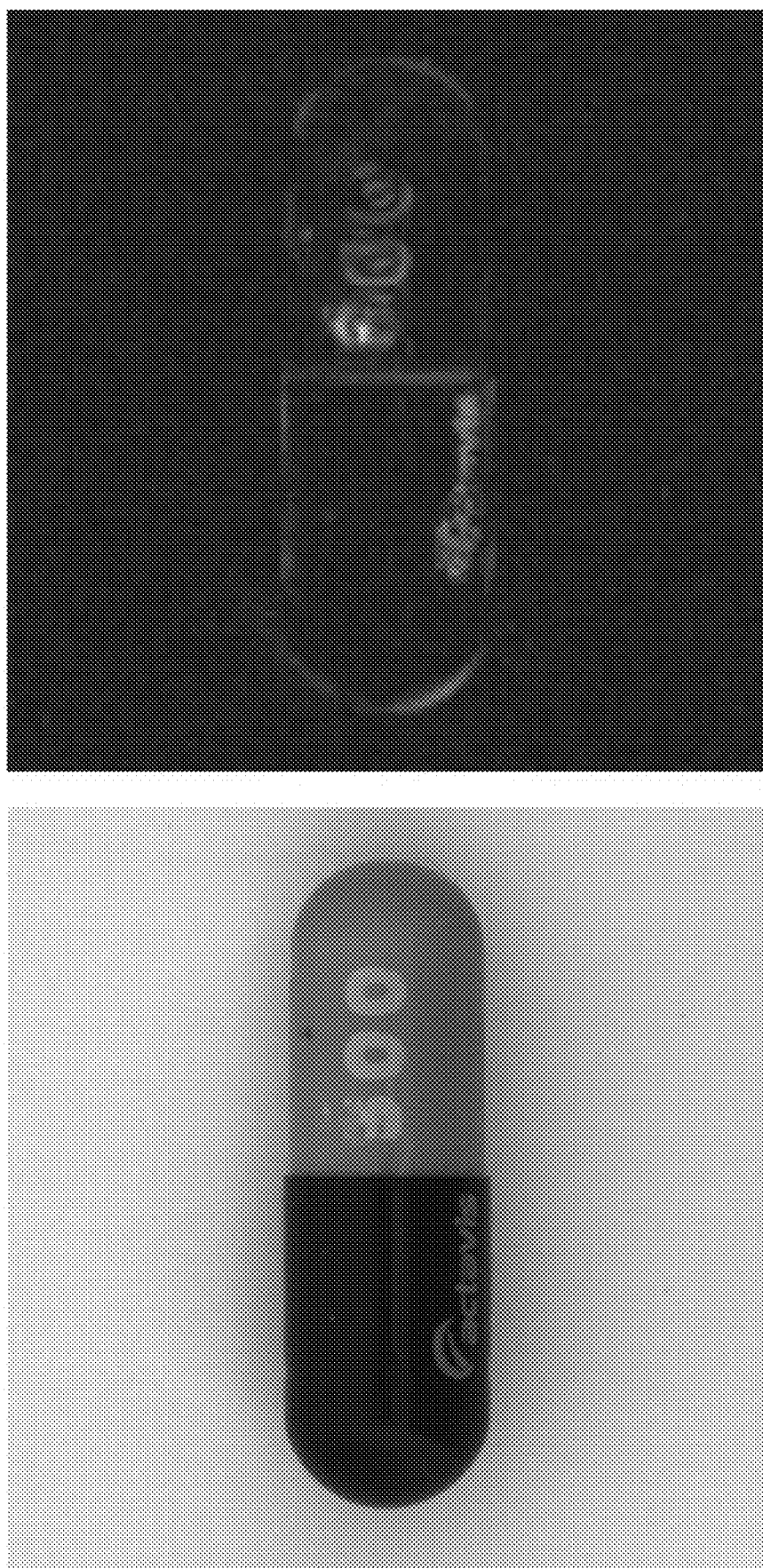
FIG. 11 illustrates a first object having anomalies and a heat-map displaying anomaly probabilities on the first object, the heat-map being generated accordance with an embodiment of the present technology.

FIG. 11 illustrates a first object having anomalies and a heat-map displaying anomaly probabilities on the first object, the heat-map being generated accordance with an embodiment of the present technology. The object on the left-hand side of FIG. 11 is a capsule on which some markings (a logo, letters and digits) have not been properly printed or have been partially erased. On the right-hand side, the heat-map reproduces an outline of the capsule, generally with dark shades or colors. Lighter areas of the heat-map reveal high probabilities of anomalies on the image of the capsule. There is good consistency between the heat-map and the visible defects on the capsule.

Figure 12:
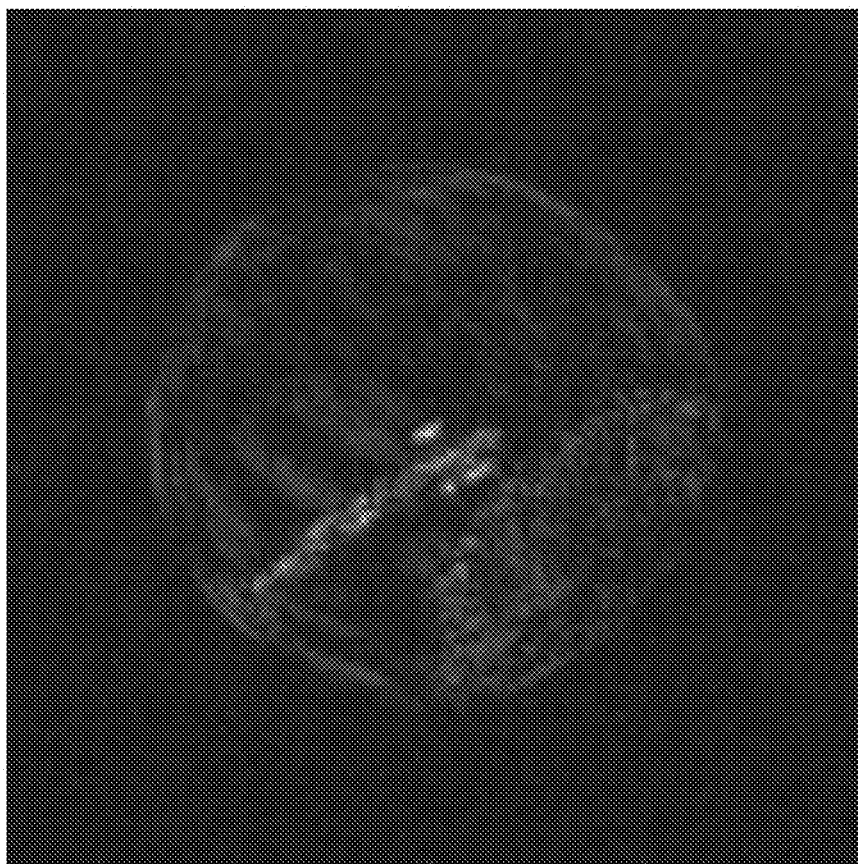
FIG. 12 illustrates a second object having anomalies and a heat-map displaying anomaly probabilities on the second object, the heat-map being generated accordance with an embodiment of the present technology.
Figure 12:
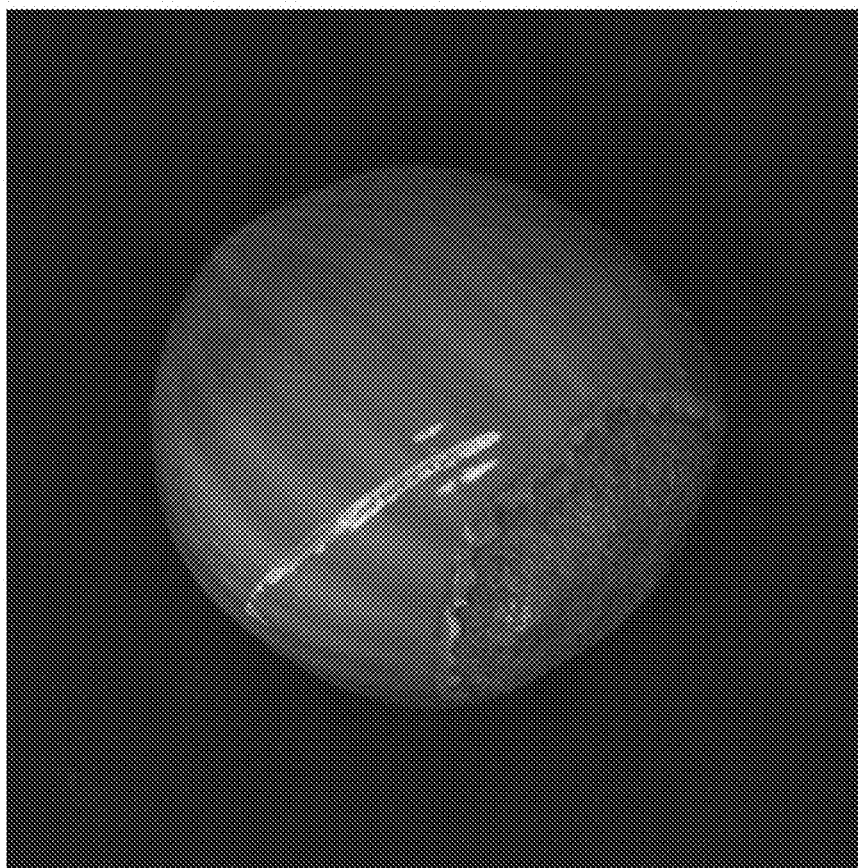

FIG. 12 illustrates a second object having anomalies and a heat-map displaying anomaly probabilities on the second object, the heat-map being generated accordance with an embodiment of the present technology. The object on the left-hand side of FIG. 12 is an acorn on showing an elongated scratch as well as shorter scratches on each side thereof. On the right-hand side, the heat-map reproduces an outline of the acorns, generally with dark shades or colors. Lighter areas of the heat-map reveal high probabilities of anomalies on the image of the acorn. There is good consistency between the heat-map and the visible defects on the acorn.

Figure 13:
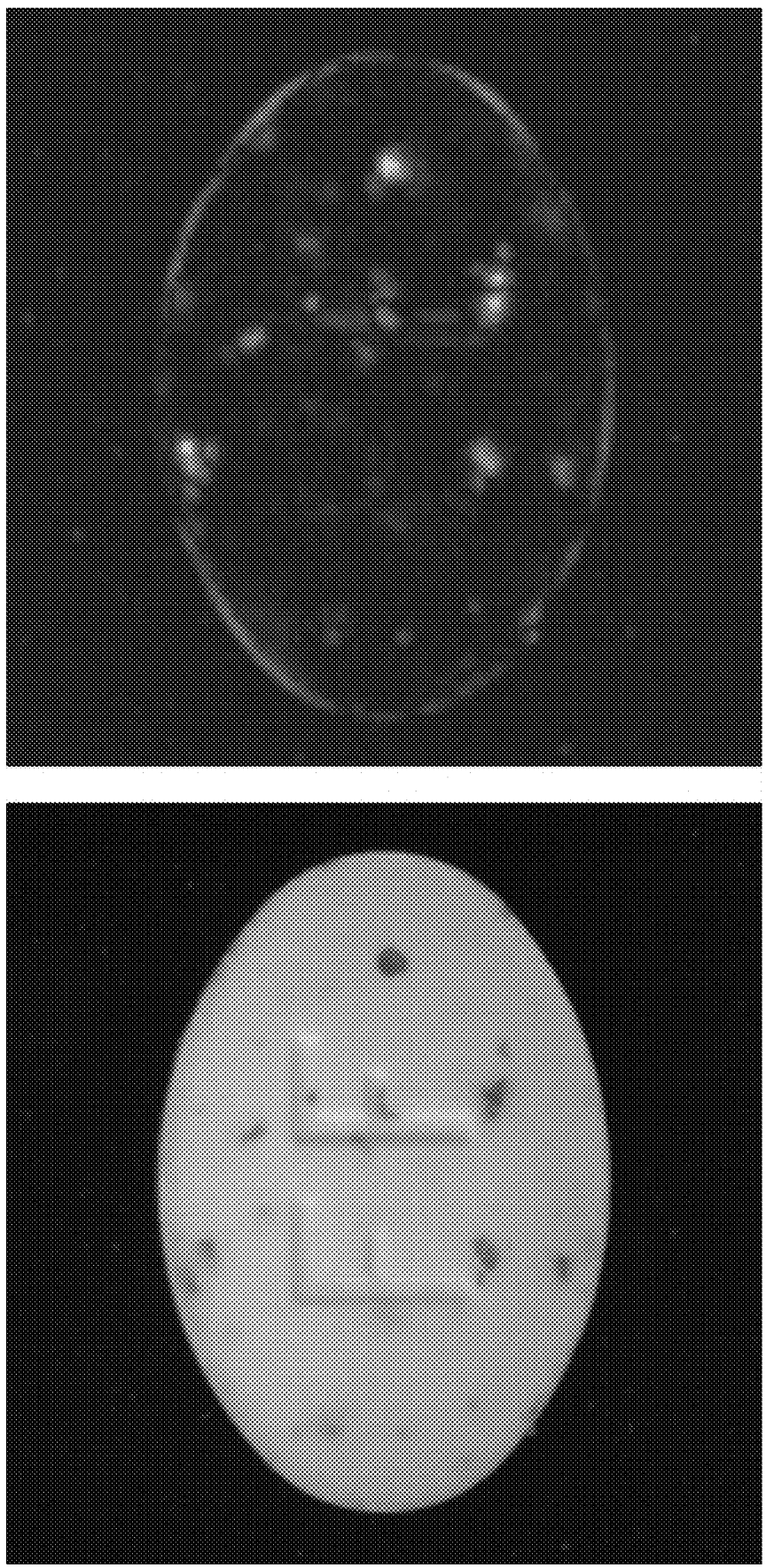
FIG. 13 illustrates a third object having anomalies and a heat-map displaying anomaly probabilities on the third object, the heat-map being generated accordance with an embodiment of the present technology.

FIG. 13 illustrates a third object having anomalies and a heat-map displaying anomaly probabilities on the third object, the heat-map being generated accordance with an embodiment of the present technology. The object on the left-hand side of FIG. 13 is a pill having a plurality of dark spots on its surface. On the right-hand side, the heat-map reproduces an outline of the pill, generally with dark shades or colors. Lighter areas of the heat-map reveal high probabilities of anomalies on the image of the pill. There is good consistency between the heat-map and the visible defects on the pill.

Figure 14:
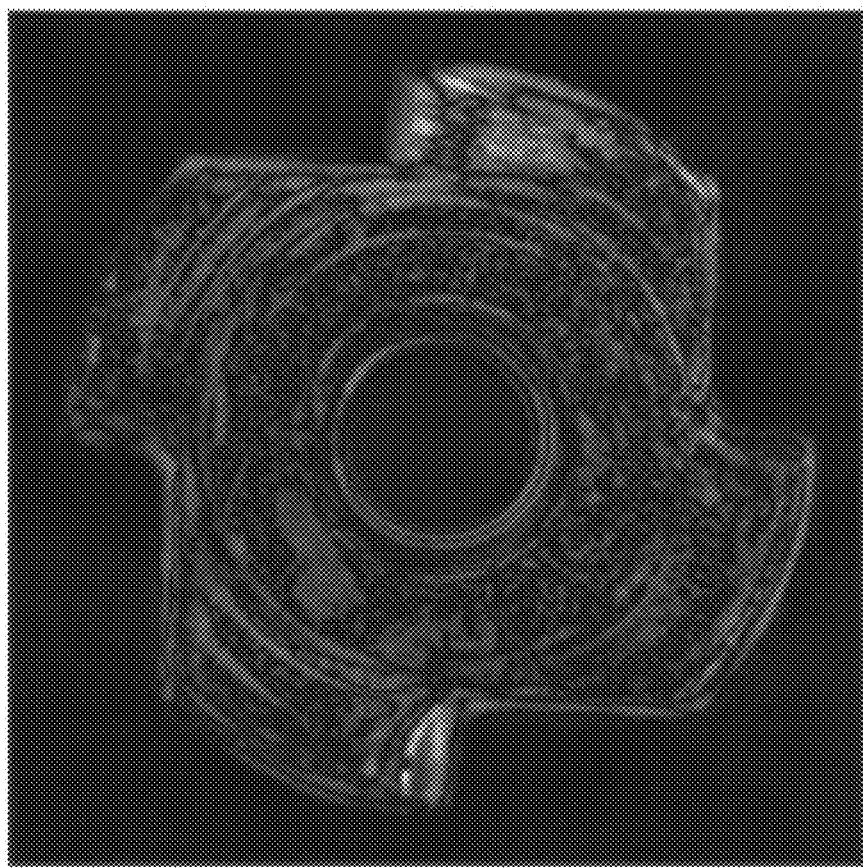
FIG. 14 illustrates a fourth object having anomalies and a heat-map displaying anomaly probabilities on the fourth object for a set of anomaly types, the heat-map being generated accordance with an embodiment of the present technology.
Figure 14:
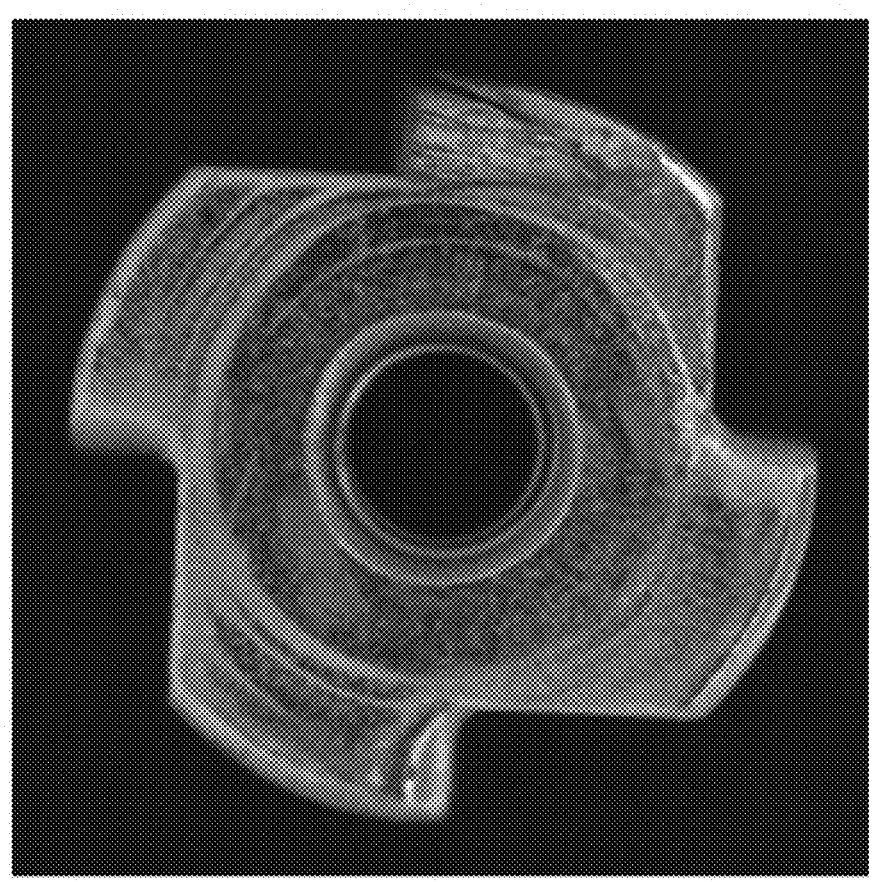

FIG. 14 illustrates a fourth object having anomalies and a heat-map displaying anomaly probabilities on the fourth object for a set of anomaly types, the heat-map being generated accordance with an embodiment of the present technology. The object on the left-hand side of FIG. 14 is a metallic nut having a plurality of anomalies. It may be observed that two main anomalies are present, respectively on the left part and on the right part of the metallic nut. The right-hand side of FIG. 14 shows the heat-map reproducing an outline of the metallic nut, generally with dark shades or colors. Lighter areas of the heat-map reveal high probabilities of anomalies on the image of the metallic nut. There is good consistency between the heat-map and the visible defects on the metallic nut. The heat-map may have been obtained following training of either of the systems 200 or 300 with a set of anomaly types including at least the anomalies present on the left and right parts of the metallic nut.

Figure 15:
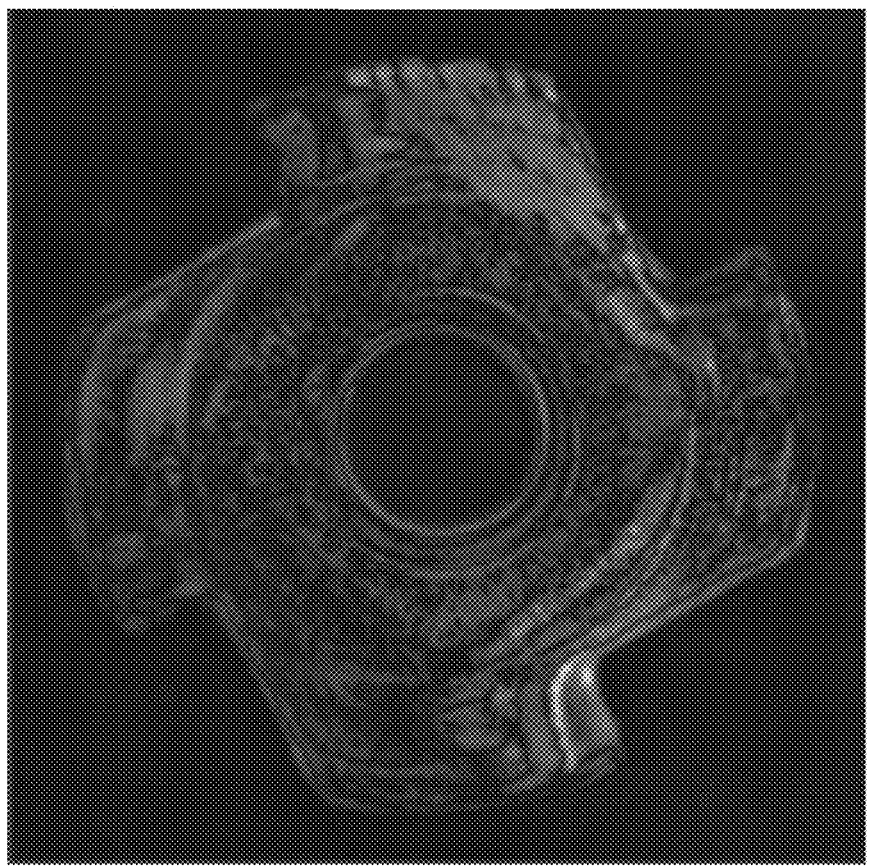
FIG. 15 illustrates the fourth object of FIG. 14 having new anomalies and a heat-map displaying anomaly probabilities on the fourth object for another set of anomaly types, the heat-map being generated accordance with an embodiment of the present technology.
Figure 15:
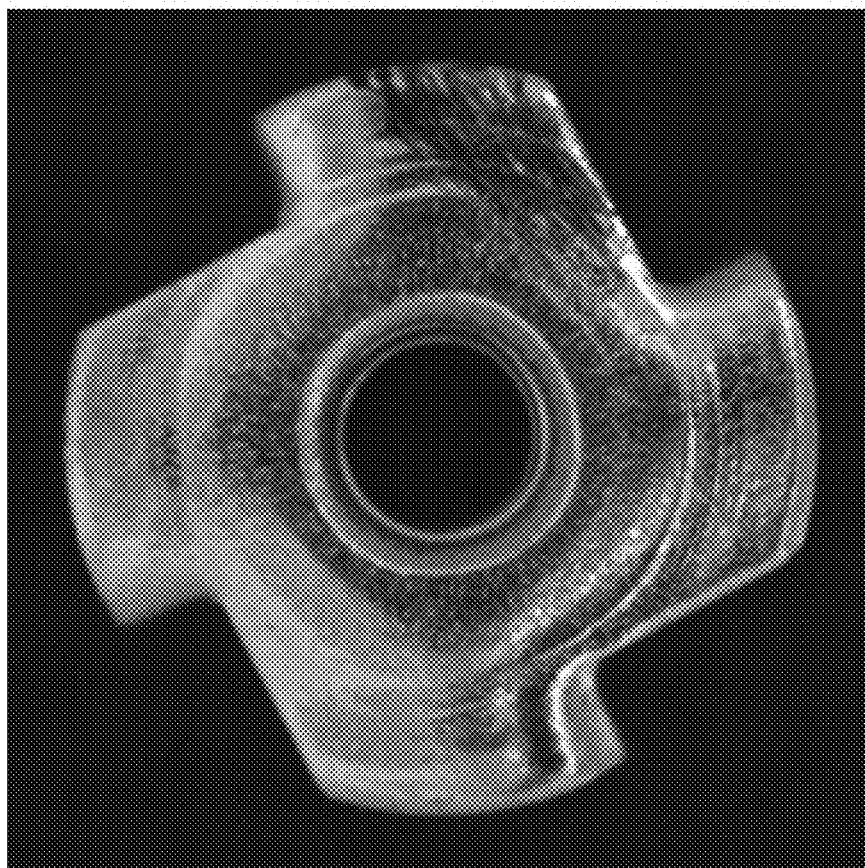

FIG. 15 illustrates the fourth object of FIG. 14 having new anomalies and a heat-map displaying anomaly probabilities on the fourth object for another set of anomaly types, the heat-map being generated accordance with an embodiment of the present technology. The metallic nut shown on the left-hand side of FIG. 15 shows, on its left part, an anomaly that is similar to the anomaly shown on the left part of the metallic nut of FIG. 14. The metallic nut of FIG. 15 however shows, on its right part, a new type of anomaly. The right-hand side of FIG. 15 shows the heat-map reproducing an outline of the metallic nut, generally with dark shades or colors. Lighter areas of the heat-map reveal high probabilities of anomalies on the image of the metallic nut. There is good consistency between the heat-map and the visible defects on the metallic nut. In particular, the heat-maps of FIGS. 14 and 15 may have been obtained following training of the system 300, initially with a first set of anomaly types including the anomalies present on the left and right parts of the metallic nut of FIG. 14, the system 300 being later retrained with a second set of anomaly types including new anomaly present on the right part of the metallic nut of FIG. 15.

Experimental results have been obtained using the anomaly detection system 300. For each of many repetitions of the experiments, the model of the system 300 was initially trained with a first set including 6 anomaly types and then retrained with a second set including 6 new anomaly types. There was no overlap between the anomaly types of the first and second sets.

While conventional anomaly detection technologies lose performance in the detection of old anomaly types after being retrained with newer anomaly types, the experimental results obtained using the system 300 show a 30% improvement in the anomaly detection performance for the first set when the model was retrained with the second set. When compared with conventional image detection technologies, anomaly detection accuracy was improved by 28% for the second set. An amount of memory consumed by the latent space was reduced by approximately 50%. At inference time, anomaly detection was about twice as fast as when using conventional image detection technologies.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented continuous training method for a system identifying anomalies in an image of an object, comprising:
    training the system by:
        supplying, to an image encoder, one or more first sets of images corresponding to one or more first anomaly types for the object, the image encoder forming a model of the object in a latent space,
        supplying labels to an anomaly encoder, each label corresponding to a respective image among the one or more first sets of images corresponding to the one or more first anomaly types for the object, each label identifying a related anomaly type for the object,
        calculating, at the anomaly encoder, a vector containing a mean for each of one or more first model modes defined for the one or more first anomaly types,
        calculating, at the anomaly encoder, a vector containing a standard deviation for each of the one or more first model modes defined for the one or more first anomaly types, and
        calculating a log-likelihood loss for each of the one or more first anomaly types based on their respective mean and standard deviation; and
    retraining the system by:
        supplying, to the image encoder, one or more second sets of images corresponding to one or more second anomaly types for the object, the image encoder updating the model of the object in the latent space,
        supplying additional labels, to the anomaly encoder, each additional label corresponding to a respective image among the one or more second sets of images corresponding to the one or more second anomaly types for the object, each additional label identifying a related anomaly type for the object,
        updating, at the anomaly encoder, the vector containing the mean for each of the one or more first model modes defined for the one or more first anomaly types by adding a mean for each of one or more second model modes defined for the one or more second anomaly types,
        updating, at the anomaly encoder, the vector containing the standard deviation for each of the one or more first model modes defined for the one or more first anomaly types by adding a standard deviation for each of one or more second model modes defined for the one or more second anomaly types,
        supplying, to the latent space, a statistically sufficient sample of information contained in the vectors containing the means and standard deviations, and
        calculating a log-likelihood loss for each of the first and second anomaly types based on their respective mean and standard deviation.

2. The method of claim 1, wherein the model of the object is a flow-based model.

3. The method of claim 1, wherein the model of the object is a generative adversarial network model.

4. The method of claim 1, wherein the model of the object is a variational autoencoder model.

5. The method of claim 1, wherein:
    training the system further comprises using classification information for each of the one or more first anomaly types when forming the model of the object in the latent space; and retraining the system further comprises using classification information for each of the one or more first anomaly types and for each of the one or more second anomaly types when updating the model of the object in the latent space.

6. The method of claim 5, further comprising:
supplying, to a classifier, a first label for each image among the one or more first sets of images;
calculating, by the classifier, a first classification loss for each of the first anomaly types;
using the first classification losses for training the system;
supplying, to the classifier a second label for each image among the one or more second sets of images;
calculating, by the classifier, a second classification loss for each of the second anomaly types; and
using the second classification losses for retraining the system.

7. The method of claim 6, further comprising:
supplying, to the classifier, a content of the latent space;
using, at the classifier, the content of the latent space to classify each of the one or more first anomaly types for the object; and
using, at the classifier, the content of the latent space to classify each of the one or more second anomaly types for the object.

8. The method of claim 7, wherein the content of the latent space supplied to the classifier is a portion of the latent space.

9. The method of claim 1, wherein the retraining of the system is performed without downtime of the system.

10. The method of claim 1, wherein training the system further comprises:
supplying, to an image encoder the system, a set of anomaly-free images of an object;
encoding, by the image encoder, each anomaly free image of the object to form a corresponding image model in the latent space;
generating, in an image decoder of the system, an output image corresponding to each of the image models; and
calculating, in the system, a reconstruction loss based on a norm of differences between each anomaly-free image of the object and the corresponding output image.

11. The method of claim 10, wherein the anomaly-free images of the object are augmented images.

12. The method of claim 1, wherein training the system further comprises calculating a regularization loss based on a ratio of an output of a previous layer of the model of the object over an output of a current layer of the model of the object.

13. The method of claim 1, wherein the images of the one or more first sets of images corresponding to the one or more first anomaly types for the object and the images of the one or more second sets of images corresponding to the one or more second anomaly types for the object are augmented images.

14. The method of claim 13, wherein each augmented image is obtained by adding thereto an alteration selected from a random noise, a random cropping, a random rotation, a random set of white patches, a random set of black patches and a combination thereof.

15. A system for identifying anomalies in an object, comprising:
an image encoder;
an anomaly encoder; and
a training engine adapted to train the system by:
supplying, to the image encoder, one or more first sets of images corresponding to one or more first anomaly types for the object, the image encoder forming a model of the object in a latent space,
supplying labels to the anomaly encoder, each label corresponding to a respective image among the one or more first sets of images corresponding to the one or more first anomaly types for the object, each label identifying a related anomaly type for the object,
calculating, at the anomaly encoder, a vector containing a mean for each of one or more first model modes defined for the one or more first anomaly types,
calculating, at the anomaly encoder, a vector containing a standard deviation for each of the one or more first model modes defined for the one or more first anomaly types, and
calculating a log-likelihood loss for each of the one or more first anomaly types based on their respective mean and standard deviation; and
the training engine being also adapted to retrain the system by:
supplying, to the image encoder, one or more second sets of images corresponding to one or more second anomaly types for the object, the image encoder updating the model of the object in the latent space,
supplying additional labels to the anomaly encoder, each additional label corresponding to a respective image among the one or more second sets of images corresponding to the one or more second anomaly types for the object, each label identifying a related anomaly type for the object,
updating, at the anomaly encoder, the vector containing the mean for each of the one or more first model modes defined for the one or more first anomaly types by adding a mean for each of one or more second model modes defined for the one or more second anomaly types,
updating, at the anomaly encoder, the vector containing the standard deviation for each of the one or more first model modes defined for the one or more first anomaly types by adding a standard deviation for each of one or more second model modes defined for the one or more second anomaly types,
supplying, to the latent space, a statistically sufficient sample of information contained in the vectors containing the means and standard deviations, and
calculating a log-likelihood loss for each of the first and second anomaly types based on their respective mean and standard deviation.

16. The system of claim 15, further comprising an image decoder, wherein:
the image encoder implements a first function;
the image decoder implements a second function, the second function being an inverse of the first function; and
the image encoder and the image decoder share a common set of weights.

17. The system of claim 16, further comprising:
an input interface operatively connected to the image encoder; and
an output interface operatively connected to the image decoder;
wherein:
the input interface is adapted to receive an input image of the object from an image source and to provide the input image to the image encoder;

the image encoder is adapted to generate an image model based on the input image of the object;

the image decoder is adapted to generate a decoded image of the object based on the image model; and the output interface is adapted to transmit the decoded image of the object to an image receiver.

\* \* \* \* \*